United States Patent
Watarai et al.

(10) Patent No.: US 9,650,105 B2
(45) Date of Patent: May 16, 2017

(54) BICYCLE OPERATING DEVICE

(71) Applicant: SHIMANO INC., Sakai (JP)

(72) Inventors: Etsuyoshi Watarai, Sakai (JP); Yasuyuki Komada, Sakai (JP); Takuro Jinbu, Sakai (JP); Tatsuya Matsushita, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 14/723,403

(22) Filed: May 27, 2015

(65) Prior Publication Data
US 2016/0347403 A1    Dec. 1, 2016

(51) Int. Cl.
*B62L 3/02*    (2006.01)
(52) U.S. Cl.
CPC .................... *B62L 3/023* (2013.01)
(58) Field of Classification Search
CPC ......... B62L 3/023; B62M 25/04; B62K 23/06
USPC ......... 188/152, 344; 74/473.14, 473.15, 488, 74/489, 501.5 H, 502.2
See application file for complete search history.

(56) References Cited

U.S. PATENT DOCUMENTS

| | | | | |
|---|---|---|---|---|
| 4,921,081 A | * | 5/1990 | Chilcote | B62L 3/023 188/344 |
| 7,963,114 B2 | * | 6/2011 | Moore | B60T 11/16 188/344 |
| 2009/0008198 A1 | | 1/2009 | Jinbo et al. | |
| 2010/0052415 A1 | | 3/2010 | Vezzoli et al. | |
| 2011/0267178 A1 | * | 11/2011 | Nishihara | B62K 23/02 340/12.39 |
| 2012/0161420 A1 | * | 6/2012 | Eberlein | B60T 11/18 280/288.4 |
| 2013/0014607 A1 | * | 1/2013 | Miki | B62J 99/00 74/501.6 |

FOREIGN PATENT DOCUMENTS

| | | |
|---|---|---|
| DE | 10 2014 207 760 | 10/2015 |
| EP | 2011729 | 1/2009 |
| WO | WO 2008/093226 | 8/2008 |

* cited by examiner

*Primary Examiner* — Christopher Schwartz
(74) *Attorney, Agent, or Firm* — Mori & Ward, LLP

(57) ABSTRACT

A bicycle operating device comprises a hydraulic unit and a changing unit. The hydraulic unit includes a hydraulic cylinder, a piston, and a reservoir. The hydraulic cylinder includes a cylinder bore. The piston is movably provided in the cylinder bore. The reservoir includes a reserve chamber and a connecting hole. The connecting hole is configured to connect the cylinder bore to the reserve chamber. The changing unit is separately provided from the piston and configured to change a communication state defined between the cylinder bore and the reserve chamber via the connecting hole.

17 Claims, 22 Drawing Sheets

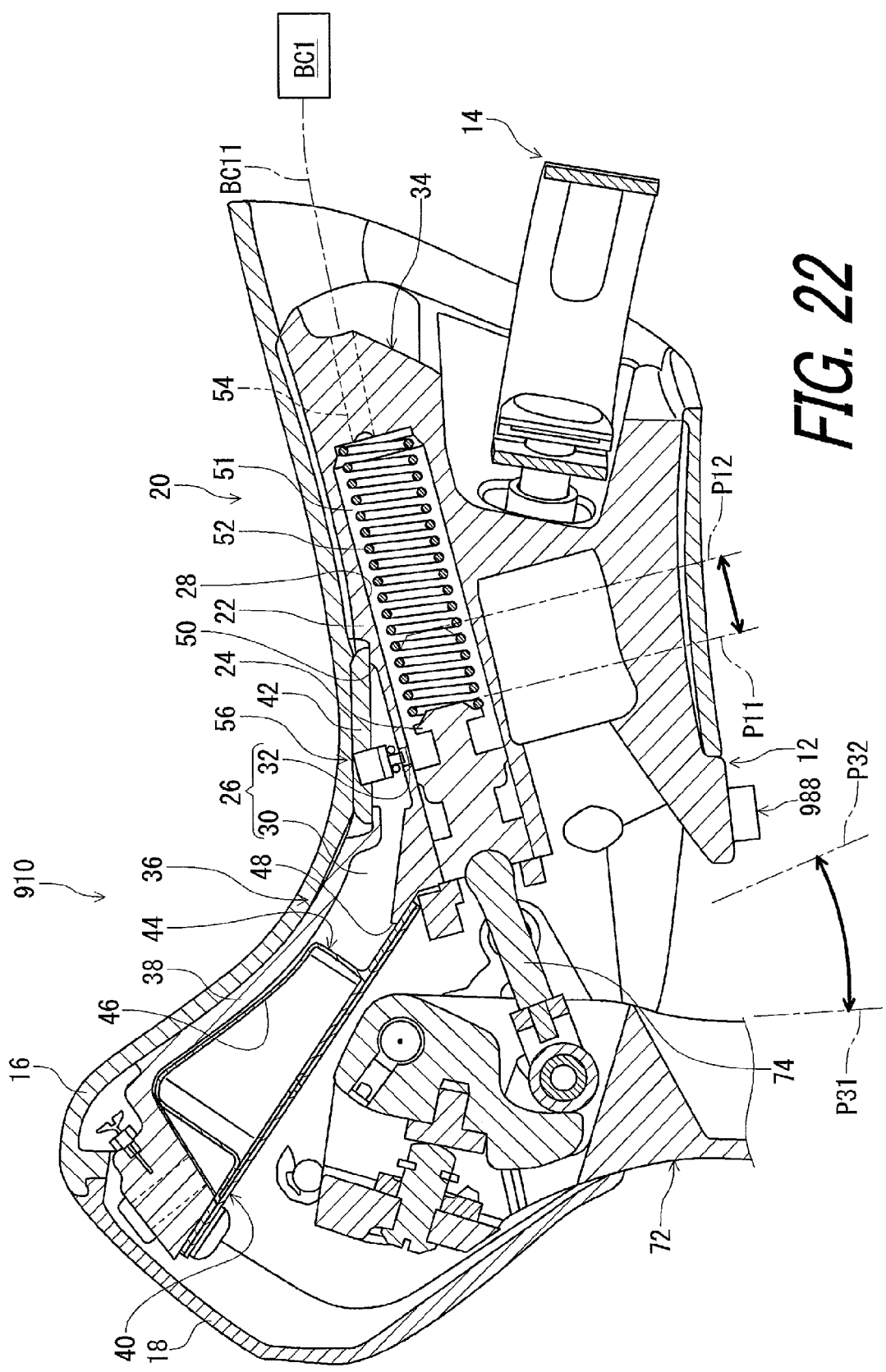

BICYCLE OPERATING DEVICE

BACKGROUND OF THE INVENTION

Field of the Invention

The present invention relates to a bicycle operating device.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle operating device.

SUMMARY OF THE INVENTION

In accordance with a first aspect of the present invention, a bicycle operating device comprises a hydraulic unit and a changing unit. The hydraulic unit includes a hydraulic cylinder, a piston, and a reservoir. The hydraulic cylinder includes a cylinder bore. The piston is movably provided in the cylinder bore. The reservoir includes a reserve chamber and a connecting hole. The connecting hole is configured to connect the cylinder bore to the reserve chamber. The changing unit is separately provided from the piston and configured to change a communication state defined between the cylinder bore and the reserve chamber via the connecting hole.

With the bicycle operating device in accordance with the first aspect, it is possible to change the communication state between the cylinder bore and the reserve chamber regardless of movement of the piston. This can shorten a response time lag between a timing at which the piston starts to move and a timing at which the communication state is changed.

In accordance with a second aspect of the present invention, the bicycle operating device according to the first aspect is configured so that the changing unit is at least partially provided in the reserve chamber.

With the bicycle operating device in accordance with the second aspect, since the changing unit is at least partially provided in the reserve chamber, it is possible to suppress increasing the size of the bicycle operating device.

In accordance with a third aspect of the present invention, the bicycle operating device according to the first or second aspect is configured so that the changing unit includes a valve member and an actuator. The valve member is movable relative to the reserve chamber to change the communication state. The actuator is configured to move the valve member relative to the reserve chamber.

With the bicycle operating device in accordance with the third aspect, since the changing unit includes the valve member and the actuator, it is possible to adjust specifications of the valve member and the actuator in accordance with a specification of the hydraulic unit.

In accordance with a fourth aspect of the present invention, the bicycle operating device according to any one of the first to third aspects further comprises a control unit configured to control the changing unit to change the communication state.

With the bicycle operating device in accordance with the fourth aspect, it is possible to adjust controlling of the changing unit in accordance with a specification of the bicycle operating device.

In accordance with a fifth aspect of the present invention, the bicycle operating device according to any one of the first to fourth aspects is configured so that the control unit is configured to control the changing unit to change the communication state based on operating information relating to the bicycle operating device.

With the bicycle operating device in accordance with the fifth aspect, it is possible to effectively shorten the response time lag using the operating information.

In accordance with a sixth aspect of the present invention, the bicycle operating device according to the fifth aspect further comprises operating member configured to be operated by a user and to be operatively coupled to the piston to move the piston relative to the hydraulic cylinder in response to an operation on the operating member. The operating information includes information relating to the operation on the operating member.

With the bicycle operating device in accordance with the sixth aspect, it is possible to effectively shorten the response time lag using the information relating to the operation on the operating member.

In accordance with a seventh aspect of the present invention, the bicycle operating device according to the sixth aspect is configured so that the operating member is movable relative to the hydraulic cylinder between a rest position and an operated position. The piston is movable relative to the hydraulic cylinder between an initial position and an actuated position in response to movement of the operating member. The control unit includes an information obtaining part configured to obtain, as the operating information, at least one of first information, second information, and third information. The first information relates to a force applied from a user to the operating member. The second information relates to movement of the operating member from the rest position. The third information relates to movement of the piston from the initial position.

With the bicycle operating device in accordance with the seventh aspect, it is possible to more effectively shorten the response time lag based on a state of the operating member and/or the piston.

In accordance with an eighth aspect of the present invention, the bicycle operating device according to the sixth or seventh aspect is configured so that the operating member is movable relative to the hydraulic cylinder between a rest position and an operated position. The piston is movable relative to the hydraulic cylinder between an initial position and an actuated position. The control unit includes an information obtaining part configured to obtain, as the operating information, at least one of first frequency information, second frequency information, third frequency information, first amount information, second amount information, and third amount information. The first frequency information relates to frequency of change in force applied to the operating member. The second frequency information relates to frequency of movement of the operating member from the rest position. The third frequency information relates to frequency of movement of the piston from the initial position. The first amount information relates to an amount of change in a hydraulic pressure in the cylinder bore. The second amount information relates to an amount of change in a temperature of fluid in the cylinder bore. The third amount information relates to an amount of change in an ambient temperature around the bicycle operating device.

With the bicycle operating device in accordance with the eighth aspect, it is possible to more effectively shorten the response time lag based on a state of the operating member and/or the hydraulic unit.

In accordance with a ninth aspect of the present invention, the bicycle operating device according to any one of the fifth to eighth aspect is configured so that the control unit is configured to store reference information. The control unit is configured to control the changing unit to change the communication state based on the operating information and the reference information.

With the bicycle operating device in accordance with the ninth aspect, it is possible to effectively shorten the response time lag using the operating information and the reference information.

In accordance with a tenth aspect of the present invention, the bicycle operating device according to the ninth aspect is configured so that the changing unit is configured to change the communication state between a first state, and a second state where a communication between the cylinder bore and the reserve chamber is restricted compared with the first state. The control unit is configured to control the changing unit based on a comparison between the operating information and the reference information to maintain the first state.

With the bicycle operating device in accordance with the tenth aspect, it is possible to more effectively shorten the response time lag using the operating information and the reference information.

In accordance with an eleventh aspect of the present invention, the bicycle operating device according to the tenth aspect is configured so that the changing unit is configured to close the communication between the cylinder bore and the reserve chamber in the second state.

In accordance with a twelfth aspect of the present invention, the bicycle operating device according to the tenth or eleventh aspect further comprises an operating member configured to be operated by a user and to be operatively coupled to the piston to move the piston relative to the hydraulic cylinder in response to an operation on the operating member. The operating member is movable relative to the hydraulic cylinder between a rest position and an operated position. The piston is movable relative to the hydraulic cylinder between an initial position and an actuated position in response to movement of the operating member. The control unit includes an information obtaining part configured to obtain, as the operating information, at least one of first information, second information, and third information. The first information relates to a force applied from a user to the operating member. The second information relates to movement of the operating member from the rest position. The third information relates to movement of the piston from the initial position.

With the bicycle operating device in accordance with the twelfth aspect, it is possible to more effectively shorten the response time lag based on a state of the operating member and/or the piston.

In accordance with a thirteenth aspect of the present invention, the bicycle operating device according to any one of the ninth to twelfth aspects is configured so that the changing unit is configured to change the communication state between a first state, and a second state where a communication between the cylinder bore and the reserve chamber is restricted compared with the first state. The control unit is configured to control the changing unit based on a comparison between the operating information and the reference information to maintain the second state.

With the bicycle operating device in accordance with the thirteenth aspect, it is possible to effectively shorten the response time lag using the operating information and the reference information.

In accordance with a fourteenth aspect of the present invention, the bicycle operating device according to the thirteenth aspect is configured so that the changing unit is configured to close the communication between the cylinder bore and the reserve chamber in the second state.

In accordance with a fifteenth aspect of the present invention, the bicycle operating device according to the thirteenth or fourteenth aspect further comprises an operating member configured to be operated by a user and to be operatively coupled to the piston to move the piston relative to the hydraulic cylinder in response to an operation on the operating member. The operating member is movable relative to the hydraulic cylinder between a rest position and an operated position. The piston is movable relative to the hydraulic cylinder between an initial position and an actuated position. The control unit includes an information obtaining part configured to obtain, as the operating information, at least one of first frequency information, second frequency information, third frequency information, first amount information, second amount information, and third amount information. The first frequency information relates to frequency of change in force applied to the operating member. The second frequency information relates to frequency of movement of the operating member from the rest position. The third frequency information relates to frequency of movement of the piston from the initial position. The first amount information relates to an amount of change in a hydraulic pressure in the cylinder bore. The second amount information relates to an amount of change in a temperature of fluid in the cylinder bore. The third amount information relates to an amount of change in an ambient temperature around the bicycle operating device.

With the bicycle operating device in accordance with the fifteenth aspect, it is possible to more effectively shorten the response time lag based on a state of the operating member and/or the hydraulic unit.

In accordance with a sixteenth aspect of the present invention, the bicycle operating device according to any one of the ninth to fifteenth aspects is configured so that the control unit is configured to change the reference information.

With the bicycle operating device in accordance with the sixteenth aspect, it is possible to change the reference information in accordance with a specification and/or an usage environmental of the bicycle operating device.

In accordance with a seventeenth aspect of the present invention, the bicycle operating device according to any one of the first to sixteenth aspects further comprises an additional operating unit via which a bicycle component is to be operated by a user.

With the bicycle operating device in accordance with the seventeenth aspect, the additional operating unit can improve the usability of the bicycle operating device.

In accordance with an eighteenth aspect of the present invention, the bicycle operating device according to the seventeenth aspect is configured so that the additional operating unit includes an electric switch.

With the bicycle operating device in accordance with the eighteenth aspect, it is possible to operate an electric bicycle component using the electric switch, improving the usability of the bicycle operating device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 22 is a partial cross-sectional view of the bicycle operating device in accordance with the ninth embodiment.

DESCRIPTION OF THE EMBODIMENTS

Figure 1:
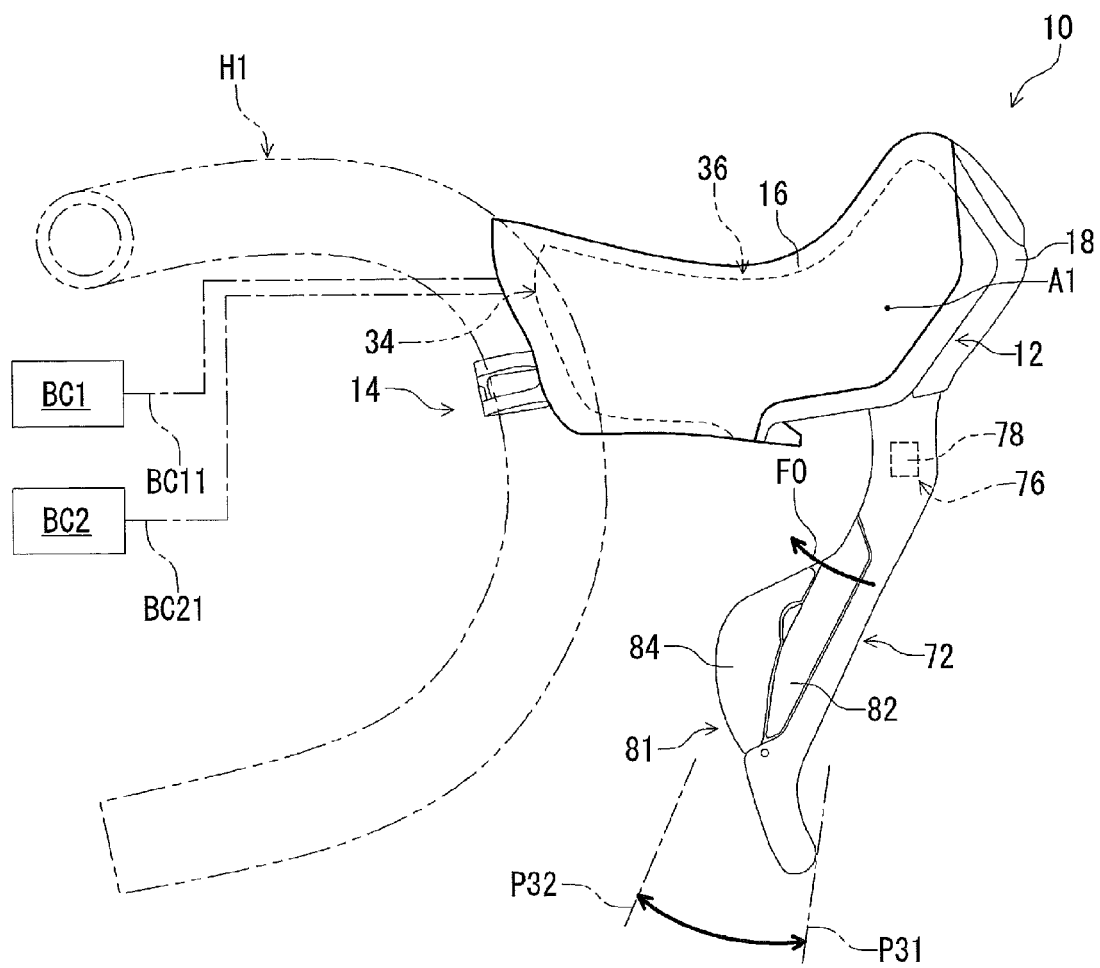
FIG. 1 is a side elevational view of a bicycle operating device in accordance with a first embodiment.

The embodiments will now be described with reference to the accompanying drawings, wherein like reference numerals designate corresponding or identical elements throughout the various drawings.

First Embodiment

Referring initially to FIG. 1, the bicycle operating device 10 in accordance with a first embodiment is configured to be mounted to a handlebar H1. The bicycle operating device 10 is configured to operate a bicycle hydraulic component BC1. In the illustrated embodiment, for example, the bicycle hydraulic component BC1 is a hydraulic brake device. The bicycle hydraulic component BC1 can also be referred to as the hydraulic brake device BC1. The bicycle hydraulic component BC1 can be other hydraulic components if needed and/or desired.

In the illustrated embodiment, the handlebar H1 is a dropdown bicycle handlebar. The bicycle operating device 10 is a right hand side control device operated by the rider's right hand to operate the hydraulic brake device BC1. It will be apparent to those skilled in the bicycle field that the constructions of the bicycle operating device 10 can be adapted to a left hand side control device that is operated by the rider's left hand.

In this embodiment, the following directional terms "forward", "rearward", "left", "right", "upward" and "downward" as well as any other similar directional terms refer to those directions which are determined on the basis of the rider who sits on a saddle (not shown) of a bicycle with facing the handlebar H1. Accordingly, these terms, as utilized to describe the bicycle operating device 10 should be interpreted relative to a bicycle equipped with the bicycle operating device 10 as used in an upright riding position on a horizontal surface.

Figure 2:
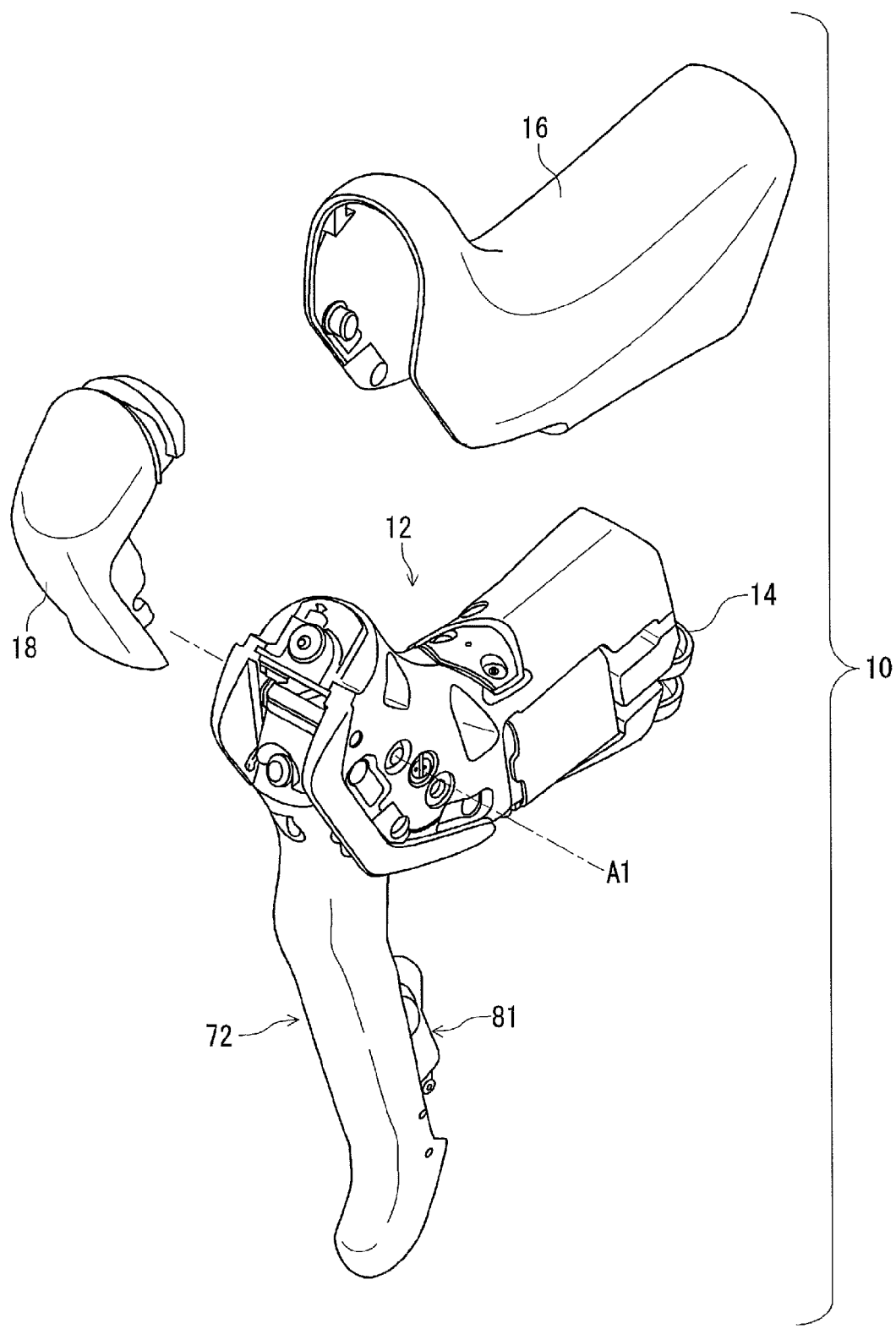
FIG. 2 is a perspective view of the bicycle operating device illustrated in FIG. 1.

As seen in FIGS. 1 and 2, the bicycle operating device 10 comprises a base member 12, a mounting member 14, a grip cover 16, and a front cover 18. The base member 12 is configured to be mounted to the handlebar H1 (FIG. 1) via the mounting member 14 such as a clamp. In the illustrated embodiment, the grip cover 16 and the front cover 18 are attached to the base member 12 to at least partially cover the base member 12. At least one of the grip cover 16 and the front cover 18 can be omitted from the bicycle operating device 10 if needed and/or desired.

Figure 3:
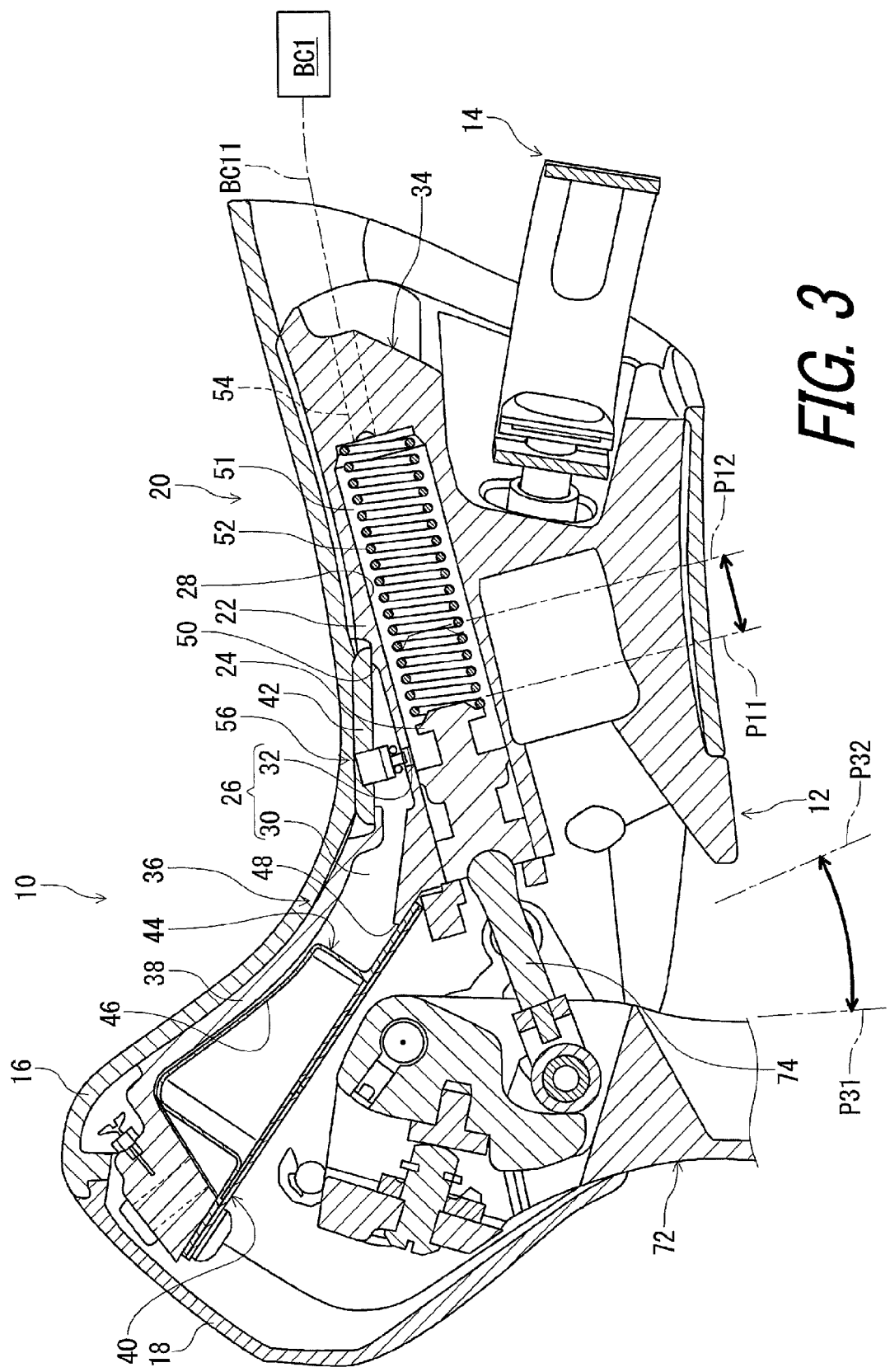
FIG. 3 is a partial cross-sectional view of the bicycle operating device illustrated in FIG. 1.

As seen in FIG. 3, the bicycle operating device 10 comprises a hydraulic unit 20. The hydraulic unit 20 includes a hydraulic cylinder 22, a piston 24, and a reservoir 26. The hydraulic cylinder 22 includes a cylinder bore 28. The piston 24 is movably provided in the cylinder bore 28. The piston 24 is movable relative to the hydraulic cylinder 22 between an initial position P11 and an actuated position P12. The reservoir 26 includes a reserve chamber 30 and a connecting hole 32. The connecting hole 32 is configured to connect the cylinder bore 28 to the reserve chamber 30.

The hydraulic cylinder 22 is provided in the base member 12. In the illustrated embodiment, the base member 12 include a mounting portion 34 and a gripping portion 36. The mounting portion 34 is configured to be mounted to the handlebar H1 (FIG. 1) via the mounting member 14. The gripping portion 36 is configured to be gripped via the grip cover 16 by a user. While the hydraulic cylinder 22 is provided in the gripping portion 36 in the illustrated embodiment, the hydraulic cylinder 22 can be provided at a position other than the gripping portion 36 if needed and/or desired. While the hydraulic cylinder 22 is integrally provided with the base member 12 as a single unitary member in the illustrated embodiment, the hydraulic cylinder 22 can be separately or detachably provided from the base member 12 if needed and/or desired.

As seen in FIG. 3, the reservoir 26 includes a reserve tank 38, a first lid 40, a second lid 42, and a flexible diaphragm 44. The reserve tank 38 includes an internal space 46. The internal space 46 includes a first opening 48 and a second opening 50. The first lid 40 is attached to the reserve tank 38 together with the flexible diaphragm 44 to cover the first opening 48 and the flexible diaphragm 44. The second lid 42 is attached to the reserve tank 38 to cover the second opening 50. The flexible diaphragm 44 is provided in the internal space 46. The reserve chamber 30 is defined by the reserve tank 38 and the flexible diaphragm 44 to reserve hydraulic fluid and has a variable internal volume. The reserve tank 38 is integrally provided with the base member 12 as a single unitary member in the illustrated embodiment, the reserve tank 38 can be separately or detachably provided from the base member 12 if needed and/or desired.

The hydraulic unit 20 includes a master chamber 51 and a biasing element 52. The master chamber 51 is defined by the hydraulic cylinder 22 and the piston 24 in the cylinder bore 28. The biasing element 52 is disposed in the master chamber 51 to bias the piston 24 to the initial position P11. In the illustrated embodiment, the biasing element 52 comprises a return spring such as a coil compression spring. The hydraulic cylinder 22 has an outlet port 54 extending from the cylinder bore 28. The master chamber 51 is connected to the reserve chamber 30 via the connecting hole 32. The master chamber 51 is connected to the bicycle hydraulic component BC1 via the outlet port 54 and a hydraulic hose BC11.

As seen in FIG. 3, the bicycle operating device 10 comprises a changing unit 56. The changing unit 56 is separately provided from the piston 24. The changing unit 56 is configured to change a communication state defined between the cylinder bore 28 and the reserve chamber 30 via the connecting hole 32. The changing unit 56 is configured to change the communication state between a first state (e.g., FIG. 4), and a second state (e.g., FIG. 5) where a communication between the cylinder bore 28 and the reserve chamber 30 is restricted compared with the first state.

Figure 4:
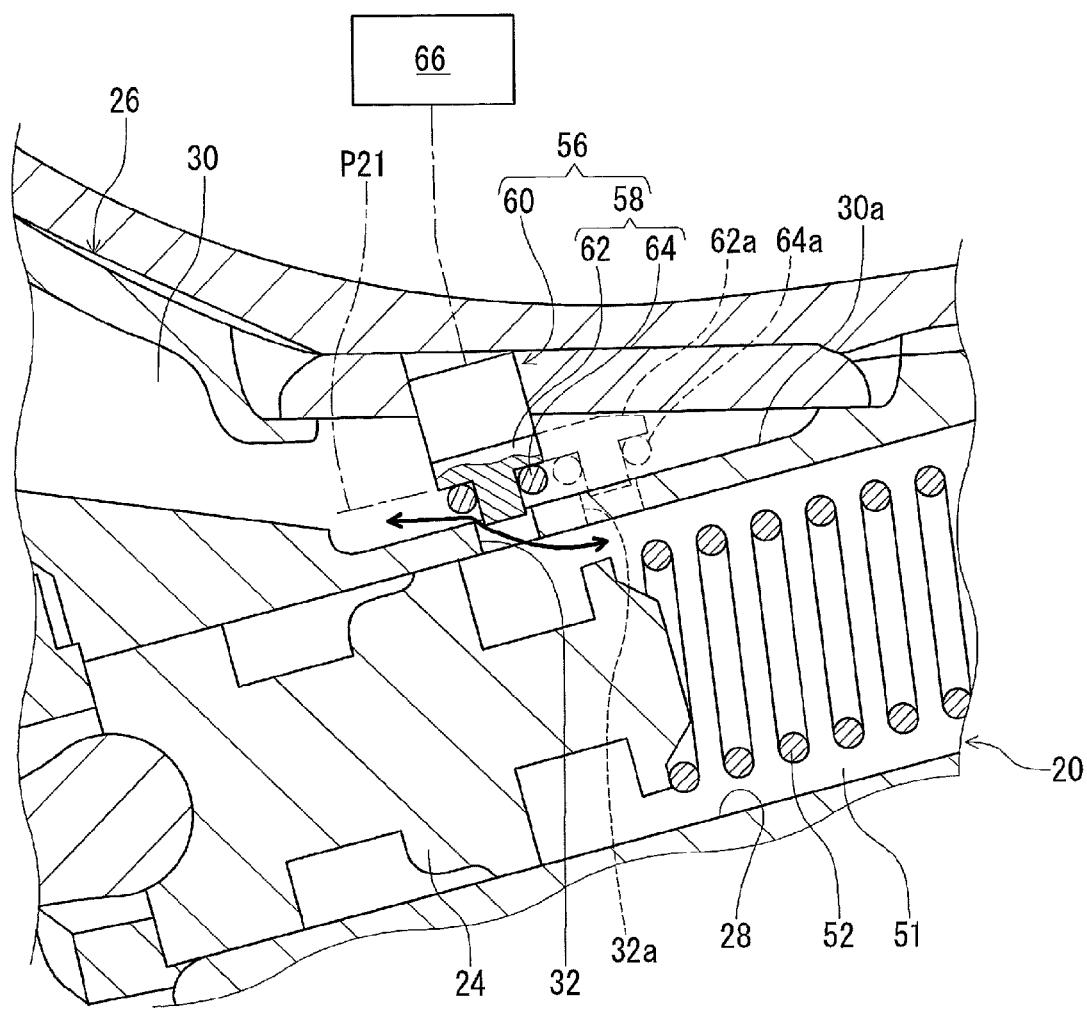
FIG. 4 is an enlarged partial cross-sectional view of the bicycle operating device illustrated in FIG. 1 (first state)
Figure 5:
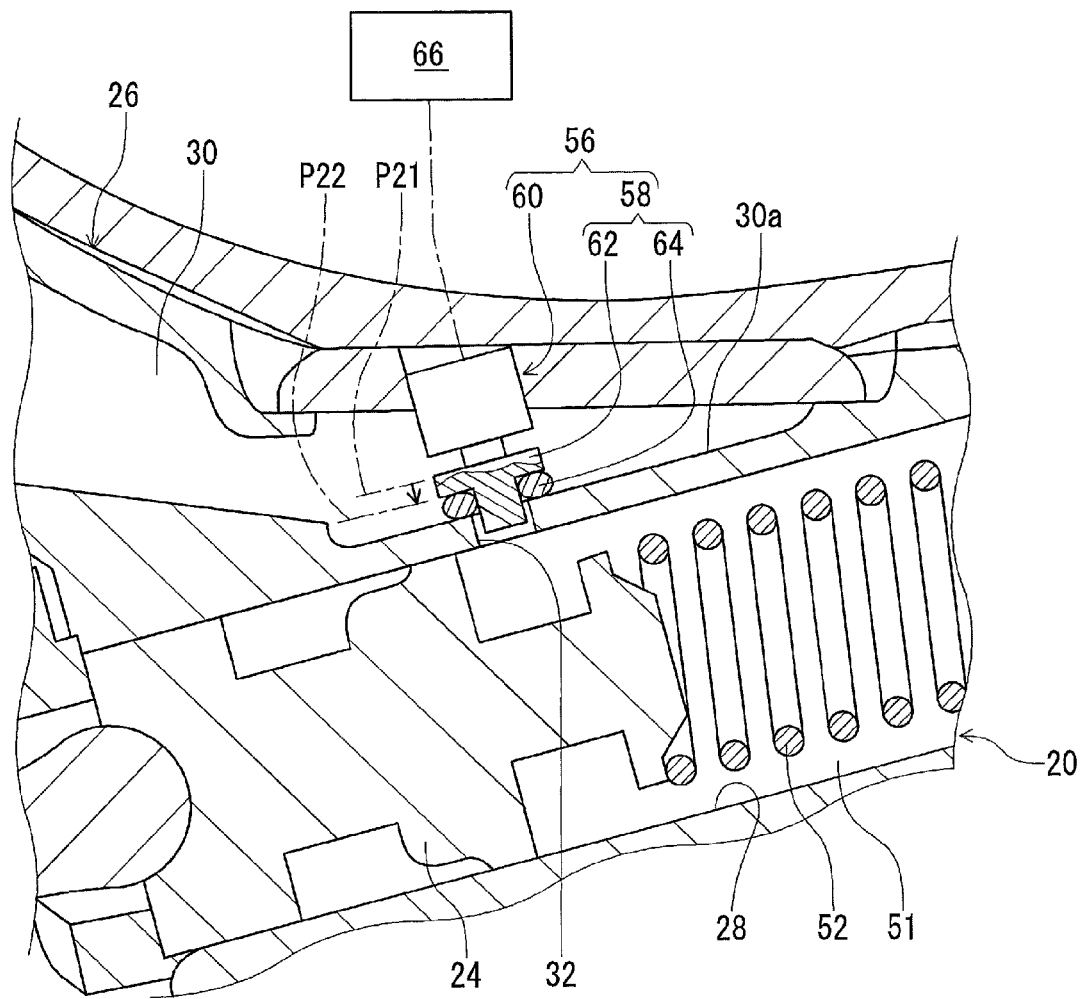
FIG. 5 is an enlarged partial cross-sectional view of the bicycle operating device illustrated in FIG. 1 (second state)

As seen in FIG. 4, the communication state defined between the cylinder bore 28 and the reserve chamber 30 is fully open in the first state. As seen in FIG. 5, the communication state defined between the cylinder bore 28 and the reserve chamber 30 is blocked in the second state. In other words, the changing unit 56 is configured to close the communication between the cylinder bore 28 and the reserve chamber 30 in the second state. In the illustrated embodiment, the first state can also be referred to as an open state, and the second state can also be referred to as a closed state. However, the first state and the second state of the hydraulic unit 20 are not limited to the illustrated embodiment. For example, the communication state defined between the cylinder bore 28 and the reserve chamber 30 can be open in the second state. In such an embodiment, a minimum cross-section of a fluid passageway in the second state is smaller than a minimum cross-section of the fluid passageway in the first state such that an opening amount of the second state is smaller than the first state.

As seen in FIG. 4, the changing unit 56 is at least partially provided in the reserve chamber 30. The changing unit 56 is attached to the second lid 42 via fasteners (not shown), for example. In the illustrated embodiment, the changing unit 56 is partially provided in the reserve chamber 30. However, the changing unit 56 can be entirely provided in the reserve chamber 30 if needed and/or desired. Since the changing unit 56 is at least partially provided in the reserve chamber 30, it is possible to suppress increasing the size of the bicycle operating device 10.

As seen in FIG. 4, the changing unit 56 includes a valve member 58 and an actuator 60. The valve member 58 is movable relative to the reserve chamber 30 to change the communication state. The actuator 60 is configured to move the valve member 58 relative to the reserve chamber 30. In the illustrated embodiment, the valve member 58 is entirely provided in the reserve chamber 30. The actuator 60 is partially provided in the reserve chamber 30. However, the valve member 58 can be partially provided in the reserve chamber 30, and the actuator 60 can be entirely provided in the reserve chamber 30.

The valve member 58 includes a valve body 62 and a seal member 64. The valve body 62 is movably supported by the actuator 60. The seal member 64 is attached to the valve body 62. Examples of the seal member 64 include an O-ring. Examples of the actuator 60 include an electromagnetic solenoid. The actuator 60 is configured to position the valve member 58 at one of a first position P21 (FIG. 4) and a second position P22 (FIG. 5). The structure of the valve member 58 is not limited to the illustrated embodiment. The valve member 58 can have such a shape that the communication state of the hydraulic unit 20 changes in accordance with the position of the valve member 58.

A total number of the connecting hole 32 and a construction of the valve member 58 can be set as needed. As illustrated with a broken line in FIG. 4, the reservoir 26 can include an additional connecting hole 32a in addition to the connecting hole 32. The connecting hole 32 and the additional connecting hole 32a are arranged in a direction in which the piston 24 is movable relative to the hydraulic cylinder 22. In this case, the valve member 58 includes an additional valve body 62a and an additional seal member 64a for changing a communication state defined between the cylinder bore 28 and the reserve chamber 30 via the additional connecting hole 32a.

As seen in FIG. 4, the communication state of the hydraulic unit 20 is in the first state (e.g., the open state) in a state where the valve member 58 is positioned at the first position P21. As seen in FIG. 5, the communication state of the hydraulic unit 20 is in the second state (e.g., the closed state) in a state where the valve member 58 is positioned at the second position P22. In the illustrated embodiment, the actuator 60 is configured to position the valve member 58 at the first position P21 (FIG. 4) in a state where electric power is not supplied to the actuator 60. Namely, the changing unit 56 serves as a normally open valve. However, the changing unit 56 can serve as a normally closed valve if needed and/or desired. Since the changing unit 56 includes the valve member 58 and the actuator 60, it is possible to adjust specifications of the valve member 58 and the actuator 60 in accordance with a specification of the hydraulic unit 20.

As seen in FIG. 4, the seal member 64 of the valve member 58 is spaced apart from an inner surface 30a of the reserve chamber 30 in a state where the valve member 58 is positioned at the first position P21. This allows the hydraulic fluid to flow between the cylinder bore 28 and the reserve chamber 30. An end of the valve body 62 is provided in the connecting hole 32 in the state where the valve member 58 is positioned at the first position P21.

As seen in FIG. 5, the seal member 64 is in contact with the inner surface 30a of the reserve chamber 30 in a state where the valve member 58 is positioned at the second position P22. This prevents the hydraulic fluid from flowing between the cylinder bore 28 and the reserve chamber 30. The end of the valve body 62 is provided in the connecting hole 32 in the state where the valve member 58 is positioned at the second position P22. This prevents the seal member 64 from being unintentionally removed from the valve body 62.

As seen in FIGS. 4 and 5, the bicycle operating device 10 further comprises a control unit 66 configured to control the changing unit 56 to change the communication state based on operating information relating to the bicycle operating device 10. In the illustrated embodiment, the control unit 66 is configured to control the changing unit 56 to change the communication state between the first state and the second state. The control unit 66 is configured to control the actuator 60 to move the valve member 58 between the first position P21 and the second position P22. Accordingly, it is possible to effectively shorten the response time lag using the operating information.

Figure 6:
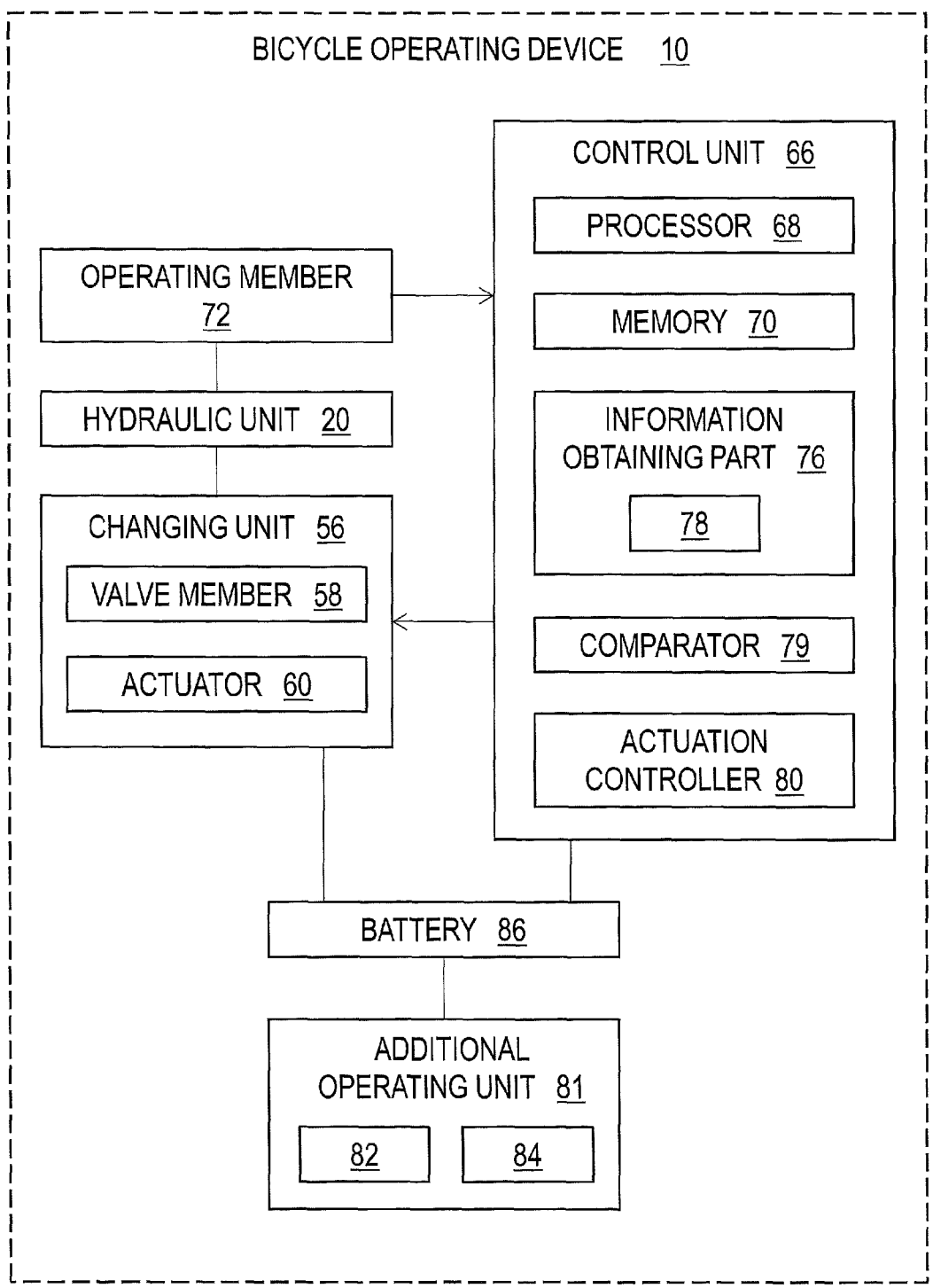
FIG. 6 is a block diagram of the bicycle operating device illustrated in FIG. 1.

As seen in FIG. 6, the control unit 66 includes a processor 68 and a memory 70. The processor 68 includes a central processing unit (CPU). The memory 70 includes a read only memory (ROM) and a random access memory (RAM). For example, a program stored in the memory 70 is read into the processor 68, and thereby functions of the control unit 66 are performed. Since the bicycle operating device 10 comprises the control unit 66, it is possible to adjust controlling of the changing unit 56 in accordance with a specification of the bicycle operating device 10.

As seen in FIG. 1, the bicycle operating device 10 further comprises an operating member 72 configured to be operated by a user. The operating member 72 is movable relative to the hydraulic cylinder 22 between a rest position P31 and an operated position P32. In the illustrated embodiment, the operating member 72 is pivotable relative to the hydraulic cylinder 22 about a pivot axis A1 in an operating direction F0 between the rest position P31 and the operated position P32. The operating member 72 is pivotably mounted to the base member 12.

In the present application, the term "rest position" as used herein refers to a position at which a movable part such as the operating member 72 remains stationary in a state where the movable part is not operated by the user. The term "operated position" as used herein refers to a position at which the movable part has been operated by the user to perform the operation of a bicycle component such as the bicycle hydraulic component BC1.

As seen in FIG. 3, the operating member 72 is operatively coupled to the piston 24 to move the piston 24 relative to the hydraulic cylinder 22 in response to an operation on the operating member 72. The operating information of the bicycle operating device 10 includes information relating to the operation on the operating member 72 as described later. In the illustrated embodiment, the piston 24 is movable relative to the hydraulic cylinder 22 between the initial position P11 and the actuated position P12 in response to movement of the operating member 72. The bicycle operating device 10 comprises a piston rod 74. The piston 24 is operatively coupled to the operating member 72 via the piston rod 74 to move relative to the hydraulic cylinder 22 in response to the pivotal movement of the operating member 72. The piston 24 is positioned at the initial position P11 in a rest state where the operating member 72 is positioned at the rest position P31. The piston 24 is positioned at the actuated position P12 in an operated state where the operating member 72 is positioned at the operated position P32.

As seen in FIG. 6, the control unit 66 is configured to store reference information RI. In the illustrated embodiment, the control unit 66 is configured to store the reference information RI in the memory 70. The control unit 66 is configured to control the changing unit 56 to change the communication state based on the operating information and the reference information RI. Accordingly, it is possible to effectively shorten the response time lag using the operating information and the reference information RI.

The control unit 66 includes an information obtaining part 76. The information obtaining part 76 is configured to obtain, as the operating information, at least one of first information I1, second information I2, and third information I3. The first information I1 relates to a force applied from a user to the operating member 72. The second information I2 relates to movement of the operating member 72 from the rest position P31. The third information I3 relates to movement of the piston 24 from the initial position P11.

In the illustrated embodiment, the information obtaining part 76 is configured to obtain the first information I1 as the operating information. However, the information obtaining part 76 can be configured to obtain at least one of the second information I2 and the third information I3 instead of or in addition to the first information I1. Since the control unit 66 includes the information obtaining part 76, it is possible to more effectively shorten the response time lag based on a state of the operating member 72 and/or the piston 24.

As seen in FIG. 6, for example, the information obtaining part 76 includes an operating force sensor 78. As seen in FIG. 1, the operating force sensor 78 is attached to the operating member 72. Examples of the operating force sensor 78 include a strain gauge. Using the operating force sensor 78, the information obtaining part 76 is configured to obtain an operating force applied to the operating member 72 for pivoting the operating member 72 from the rest position P31 toward the operated position P32, as the first information H.

The control unit 66 is configured to control the changing unit 56 based on a comparison between the operating information and the reference information RI such that the changing unit 56 maintains the first state. In this embodiment, the control unit 66 is configured to store a reference operating force in the memory 70 as the reference information RI. The control unit 66 includes a comparator 79 configured to compare the operating information with the reference information RI. In the illustrated embodiment, the comparator 79 is configured to compare the first information (the operating force) I1 with the reference information (the reference operating force) RI for determining whether the operating member 72 is operated by the user.

In the illustrated embodiment, the control unit 66 controls the changing unit 56 to maintain the first state when the first information (the operating force) I1 is equal to or smaller than the reference information (the reference operating force) RI in the first state. The information obtaining part 76 is configured to continuously obtain the first information, and the comparator 79 is configured to continuously compare the first information I1 with the reference information RI. In other words the control unit 66 is configured to monitor the first information I1 in comparison with the reference information RI. The control unit 66 controls the changing unit 56 to change the communication state from the first state to the second state when the first information I1 is larger than the reference information RI. The control unit 66 controls the changing unit 56 to maintain the second state when the first information I1 is larger than the reference information RI in the second state. The control unit 66 controls the changing unit 56 to change the communication state from the second state to the first state when the first information I1 is equal to or smaller than the reference information RI in the second state. Since the control unit 66 is configured to control the changing unit 56 based on the comparison between the operating information and the reference information RI, it is possible to effectively shorten the response time lag using the operating information and the reference information RI.

The control unit 66 includes an actuation controller or driver 80 configured to control the actuator 60 of the changing unit 56 in accordance with a command of the processor 68 based on a comparison result of the comparator 79.

As seen in FIG. 1, the bicycle operating device 10 further comprises an additional operating unit 81 via which a bicycle component BC2 is to be operated by a user. The additional operating unit 81 includes an electric switch. For example, the additional operating unit 81 is mounted on the operating member 72. The bicycle component BC2 includes an electric shifting device such as an electric derailleur. In the illustrated embodiment, the additional operating unit 81 includes electric switches 82 and 84. While the additional operating unit 81 is electrically connected to the bicycle component BC2 via a control cable BC21, the additional operating unit 81 can be wirelessly connected to the bicycle component BC2 via a wireless communication path. The electric switch 82 is configured to be operated by the user for upshifting the bicycle component BC2. The electric switch 84 is configured to be operated by the user for downshifting the bicycle component BC2. The additional operating unit 81 can improve the usability of the bicycle operating device 10. Furthermore, since the additional operating unit 81 includes the electric switch 82 and/or 84, it is possible to operate an electric bicycle component using the electric switch 82 and/or 84, improving the usability of the bicycle operating device 10.

The bicycle operating device 10 further comprises a battery 86 configured to supply electric power to the changing unit 56, the control unit 66, and the additional operating unit 81. The battery 86 is electrically connected to the changing unit 56, the control unit 66, and the additional operating unit 81.

Figure 7:
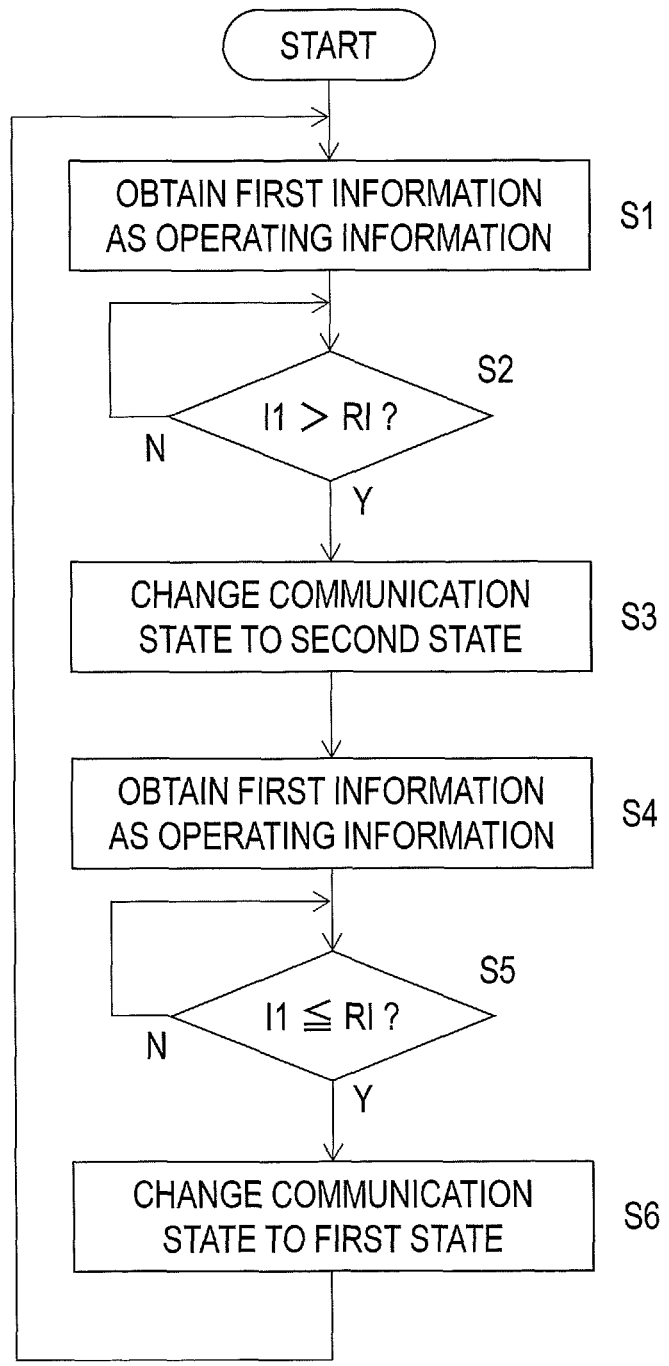
FIG. 7 is a flow chart showing an operation of the bicycle operating device illustrated in FIG. 1.

The operation of the bicycle operating device 10 will be described in detail here referring to FIG. 7. As aforesaid, the control unit 66 monitors the first information (the operating force) I1 in comparison with the reference information (the reference force) RI. As seen in FIG. 7, the first information I1 is obtained by the information obtaining part 76 as the operating information (step S1). Specifically, the operating force applied from the user to the operating member 72 is sensed by the operating force sensor 78 of the information obtaining part 76 as the first information I1.

The first information I1 is compared with the reference information RI by the comparator 79 (step S2). When the first information (the operating force) I1 is equal to or smaller than the reference information (the reference force) RI in the first state, the control unit 66 concludes that the operating member 72 is not operated by the user. Accordingly, the changing unit 56 is controlled by the control unit 66 to maintain the first state (FIG. 4) in the hydraulic unit 20 (step S2).

In the first state, the reserve chamber 30 of the reservoir 26 absorbs a volume change of the hydraulic fluid caused by a change in a fluid temperature and/or a change in an ambient temperature. This can prevent an initial position of brake pads of the hydraulic brake device BC1 from changing due to the change in the fluid temperature and/or in the ambient temperature.

When the first information I1 is larger than the reference information RI in the second state, the control unit 66 concludes that the operating member 72 is operated by the user. Accordingly, the changing unit 56 is controlled by the control unit 66 to change the communication state of the hydraulic unit 20 from the first state (FIG. 4) to the second state (FIG. 5) (steps S2 and S3).

In the second state, the hydraulic fluid is prevented from flowing between the cylinder bore 28 and the reserve chamber 30. Accordingly, the hydraulic pressure is transmitted from the hydraulic unit 20 to the hydraulic brake device BC1 via the hydraulic hose BC11 without being absorbed by the reservoir 26 when the operating member 72 is pivoted by the user from the rest position P31 to the operated position P32.

Next, the first information I1 is obtained by the information obtaining part 76 as well as the step S1 (step S4). The first information I1 is compared with the reference information RI by the comparator 79 (step S5). When the first information I1 is larger than the reference information RI in the second state, the control unit 66 concludes that the user keeps operating the operating member 72. Accordingly, the changing unit 56 is controlled by the control unit 66 to maintain the second state (FIG. 5) in the hydraulic unit 20 (step S5). The reference information RI in the step S2 can be different from the reference information RI in the step S5. The control unit 66 can be configured to control the changing unit 56 without using the reference information RI. Furthermore, the control unit 66 can be configured to change the reference information RI via an input device such as a personal computer.

When the first information I1 is equal to or smaller than the reference information RI, the control unit 66 concludes that the user finishes operating the operating member 72. Accordingly, the changing unit 56 is controlled by the control unit 66 to change the communication state of the hydraulic unit 20 from the second state (FIG. 5) to the first state (FIG. 4) (steps S5 and S6). The process returns to the step S1, and the steps S1 to S6 are repeated. While the control unit 66 controls the changing unit 56 based on a comparison between the first information I1 and the reference information RI in the illustrated embodiment, the control unit 66 can be configured to control the changing unit 56 based on input information such as the first information I1.

With the bicycle operating device 10, it is possible to change the communication state between the cylinder bore 28 and the reserve chamber 30 regardless of movement of the piston 24. This can shorten a response time lag between a timing at which the piston 24 starts to move and a timing at which the communication state is changed.

Second Embodiment

A bicycle operating device 210 in accordance with a second embodiment will be described below referring to FIGS. 8 and 9. The bicycle operating device 210 has the same construction as that of the bicycle operating device 10 except for the control unit 66. Thus, elements having substantially the same function as those in the first embodiment will be numbered the same here, and will not be described and/or illustrated again in detail here for the sake of brevity.

Figure 8:
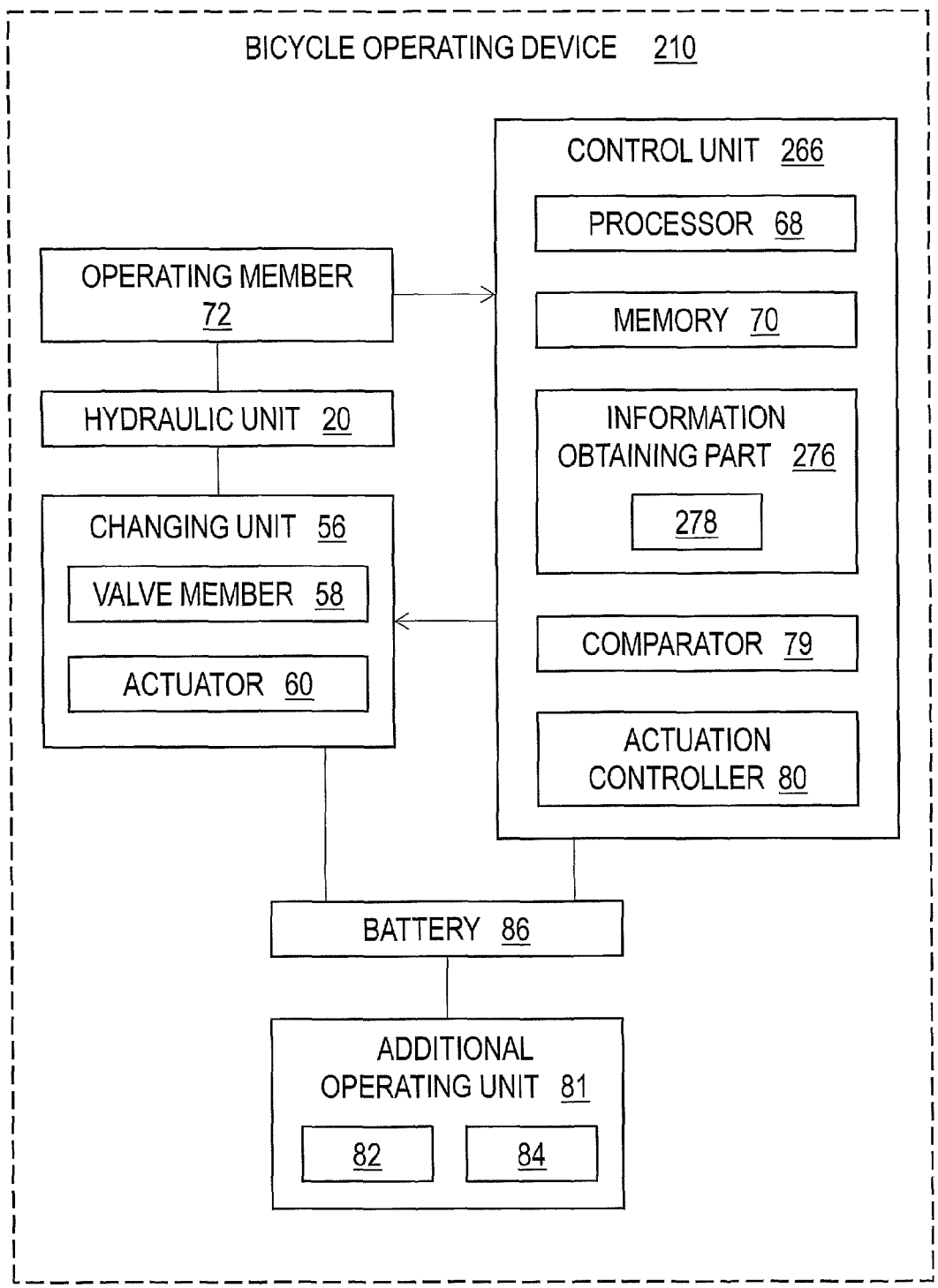
FIG. 8 is a block diagram of a bicycle operating device in accordance with a second embodiment.
Figure 9:
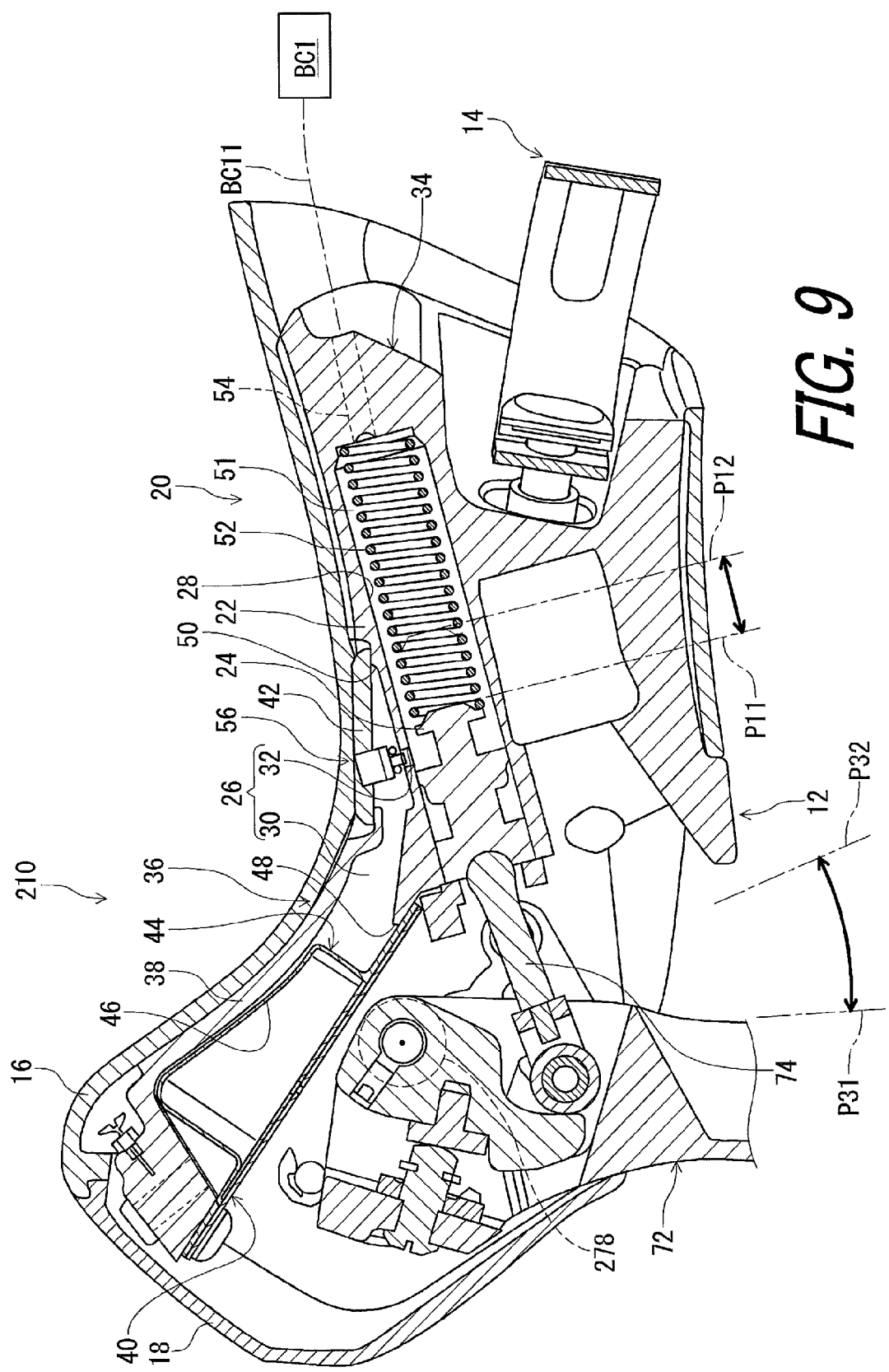
FIG. 9 is a partial cross-sectional view of the bicycle operating device in accordance with the second embodiment.

As seen in FIG. 8, the bicycle operating device 210 comprises a control unit 266. The control unit 266 includes an information obtaining part 276. The control unit 266 has substantially the same configuration as that of the control unit 66 in the first embodiment except for the information obtaining part 276. In this embodiment, the information obtaining part 276 is configured to obtain, as the operating information, the second information I2 relating to the movement of the operating member 72 from the rest position P31. In particular, the information obtaining part 276 is configured to obtain a pivotal angle of the operating member 72 from the rest position P31 as the second information I2. In accordance with this configuration of the information obtaining part 276, the control unit 266 is configured to store a reference pivotal angle in the memory 70 as the reference information RI.

The information obtaining part 276 includes a rotary position sensor 278 configured to sense a pivotal position or pivotal angle of the operating member 72 from the rest position P31. Examples of the rotary position sensor 278 include a potentiometer, a rotary encoder, and a magnetic sensor. As seen in FIG. 9, for example, the rotary position sensor 278 is mounted to the base member 12 to be operatively coupled to the operating member 72. Using the rotary position sensor 278, the information obtaining part 276 obtains the pivotal angle of the operating member 72 from the rest position P31 as the second information I2.

In the bicycle operating device 210, the control unit 266 is configured to control the changing unit 56 based on a comparison between the second information I2 and the reference information RI. The operation of the bicycle operating device 210 is substantially the same as the operation of the bicycle operating device 10 in accordance with the first embodiment. Accordingly, the description and flow chart of the operation of the bicycle operating device 210 can be obtained by changing "the first information I1" to "the second information I2" in the description and FIG. 7 of the first embodiment. Thus, the detail description and depiction of the operation of the bicycle operating device 210 will be omitted here for the sake of brevity.

With the bicycle operating device 210, it is possible to obtain substantially the same advantageous effects as those of the bicycle operating device 10 in accordance with the first embodiment.

Third Embodiment

A bicycle operating device 310 in accordance with a third embodiment will be described below referring to FIGS. 10 and 11. The bicycle operating device 310 has the same construction as that of the bicycle operating device 10 except for the control unit 66. Thus, elements having substantially the same function as those in the above embodiments will be numbered the same here, and will not be described and/or illustrated again in detail here for the sake of brevity.

Figure 10:
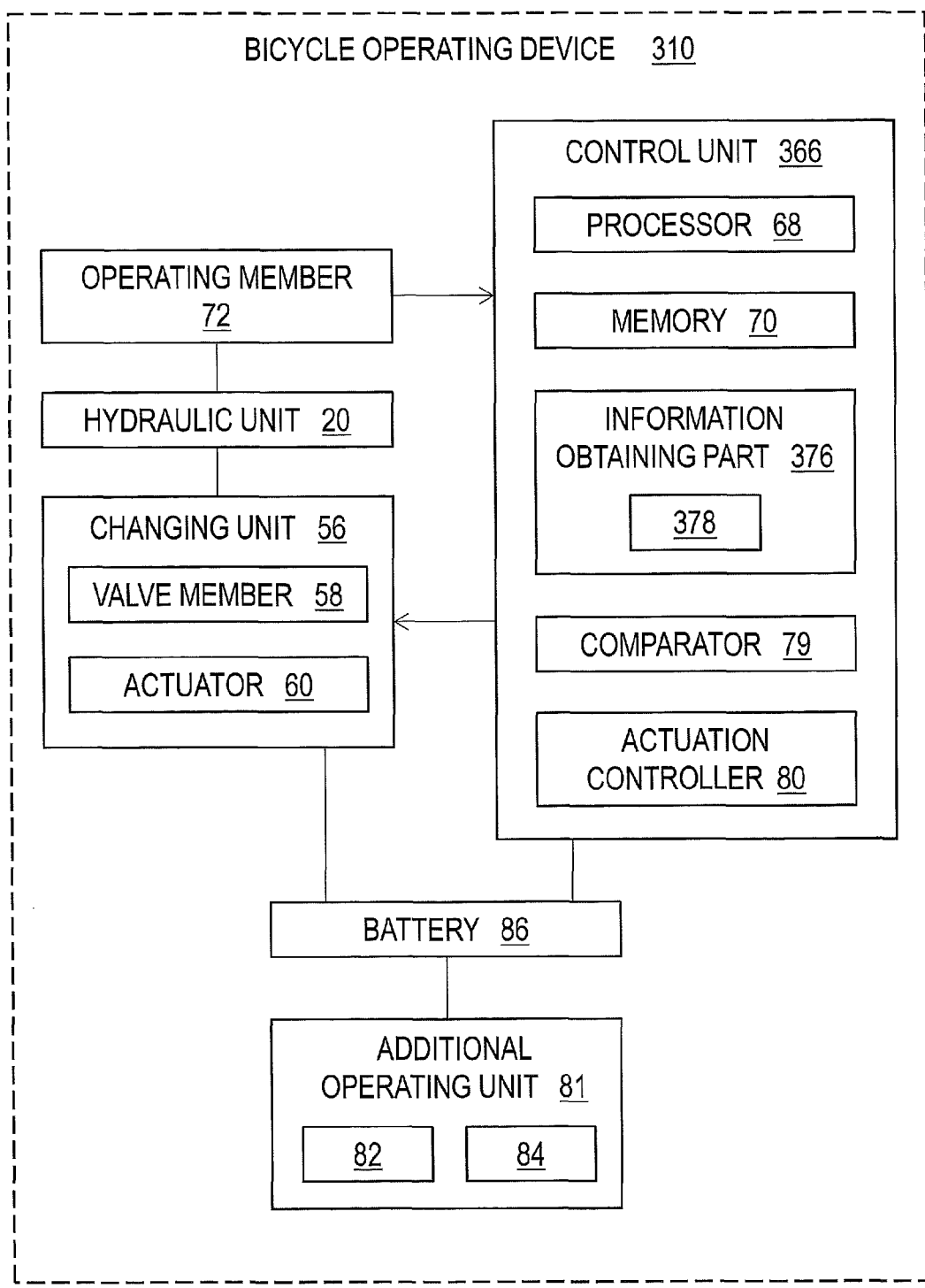
FIG. 10 is a block diagram of a bicycle operating device in accordance with a third embodiment.
Figure 11:
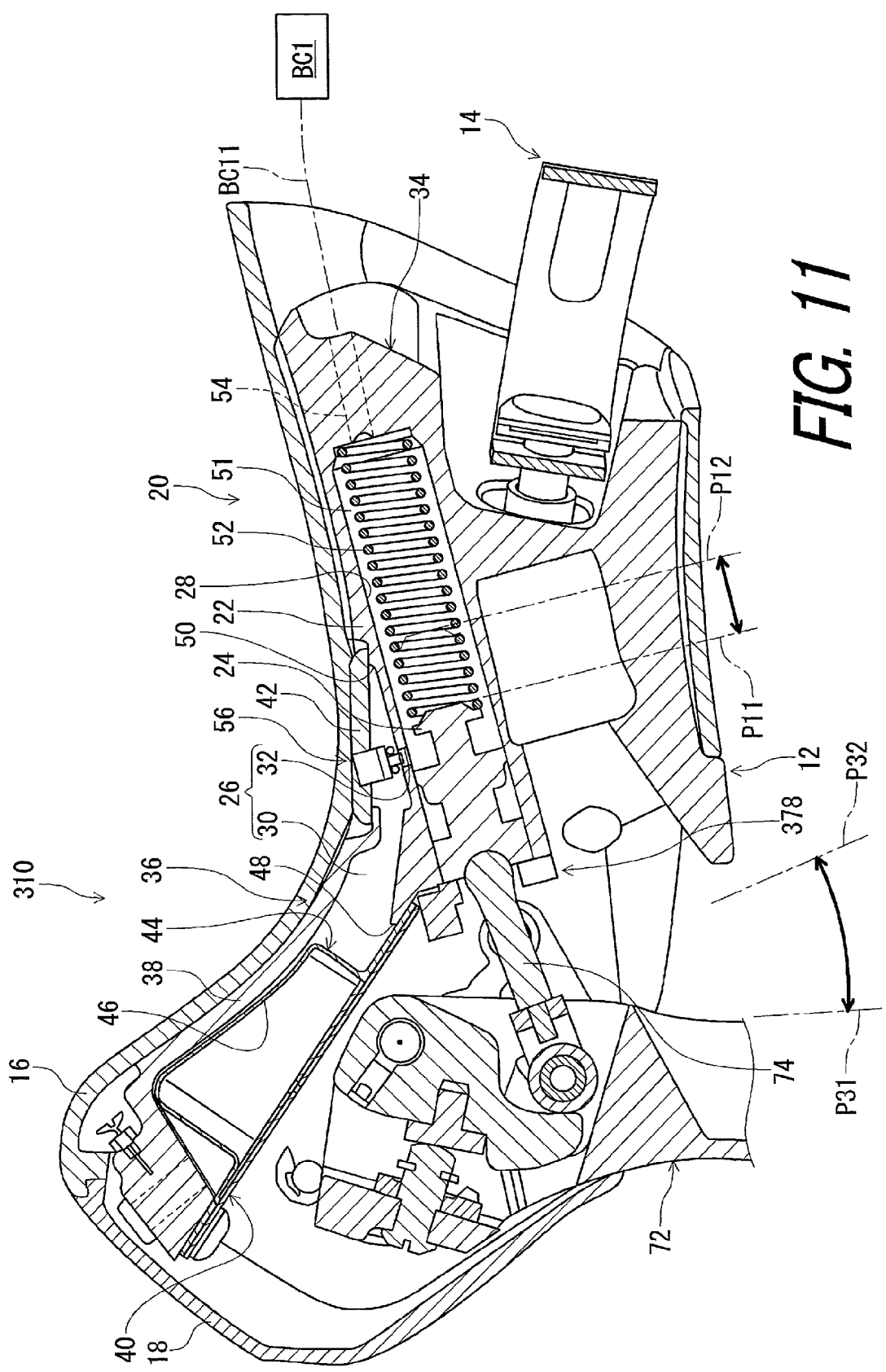
FIG. 11 is a partial cross-sectional view of the bicycle operating device in accordance with the third embodiment.

As seen in FIG. 10, the bicycle operating device 310 comprises a control unit 366. The control unit 366 includes an information obtaining part 376. The control unit 366 has substantially the same configuration as that of the control unit 66 in the first embodiment except for the information obtaining part 376. In this embodiment, the information obtaining part 376 is configured to obtain, as the operating information, the third information I3 relating to the movement of the piston 24 from the initial position P11. In particular, the information obtaining part 376 is configured to obtain a movement distance of the piston 24 from the initial position P11 as the third information I3. In accordance with this configuration of the information obtaining part 376, the control unit 366 is configured to store a reference distance in the memory 70 as the reference information RI.

The information obtaining part 376 includes a distance sensor 378 configured to sense the movement distance of the piston 24 from the initial position P11. Examples of the distance sensor 378 include a magnetic sensor. As seen in FIG. 11, for example, the distance sensor 378 is mounted to the base member 12 to sense the movement distance of the piston 24 from the initial position P11. Using the distance sensor 378, the information obtaining part 376 obtains the movement distance of the piston 24 from the initial position P11 as the third information I3.

In the bicycle operating device 310, the control unit 66 is configured to control the changing unit 56 based on a comparison between the third information I3 and the reference information RI. The operation of the bicycle operating device 310 is substantially the same as the operation of the bicycle operating device 10 in accordance with the first embodiment. Accordingly, the description and flow chart of the operation of the bicycle operating device 310 can be obtained by changing "the first information I1" to "the third information I3" in the description and FIG. 7 of the first embodiment. Thus, the detail description and depiction of the operation of the bicycle operating device 310 will be omitted here for the sake of brevity.

With the bicycle operating device 310, it is possible to obtain substantially the same advantageous effects as those of the bicycle operating device 10 in accordance with the first embodiment.

Fourth Embodiment

A bicycle operating device 410 in accordance with a fourth embodiment will be described below referring to FIGS. 12 and 13. The bicycle operating device 410 has the same construction as that of the bicycle operating device 10 except for the control unit 66. Thus, elements having substantially the same function as those in the above embodiments will be numbered the same here, and will not be described and/or illustrated again in detail here for the sake of brevity.

Figure 12:
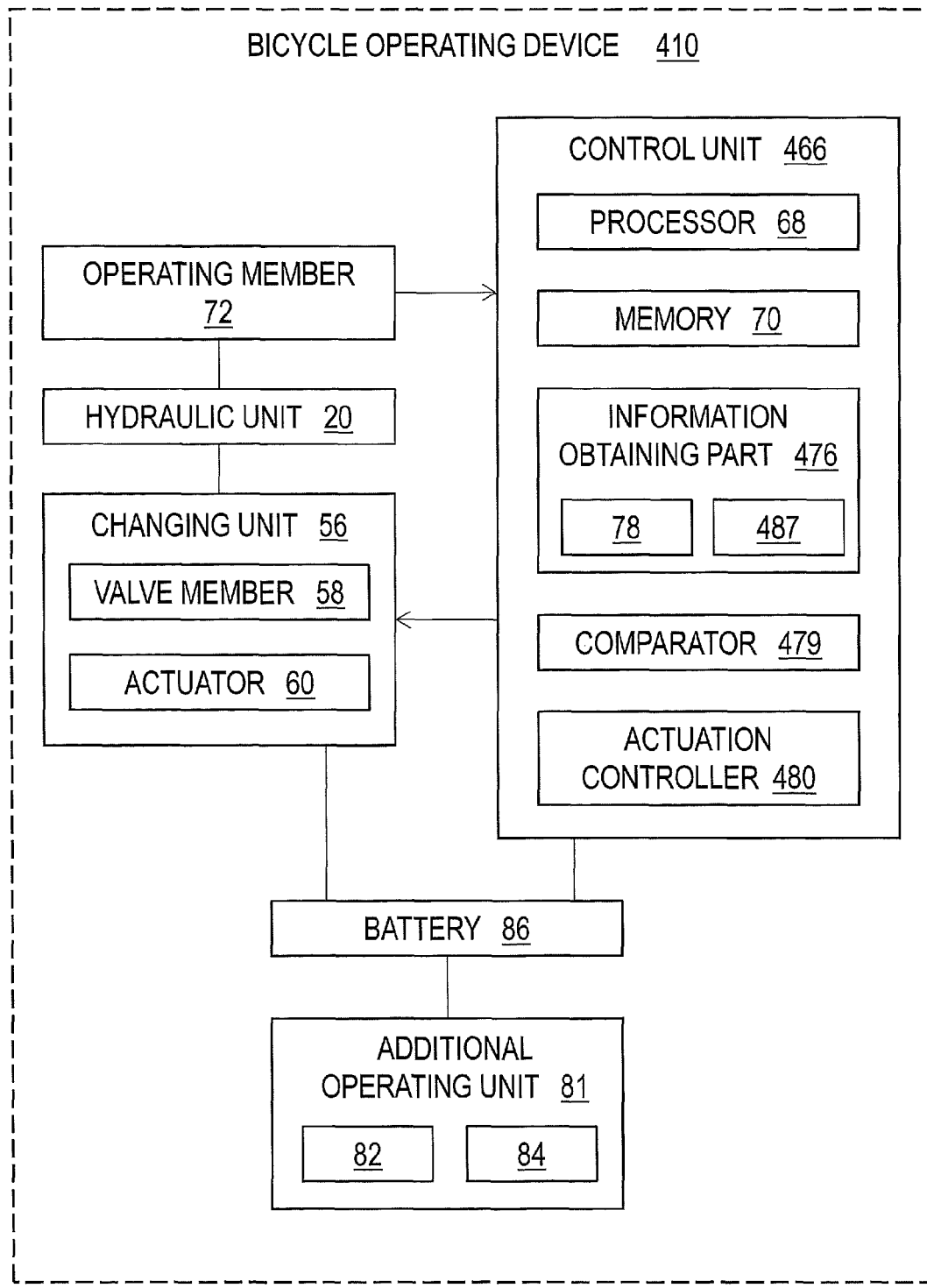
FIG. 12 is a block diagram of a bicycle operating device in accordance with a fourth embodiment.
Figure 13:
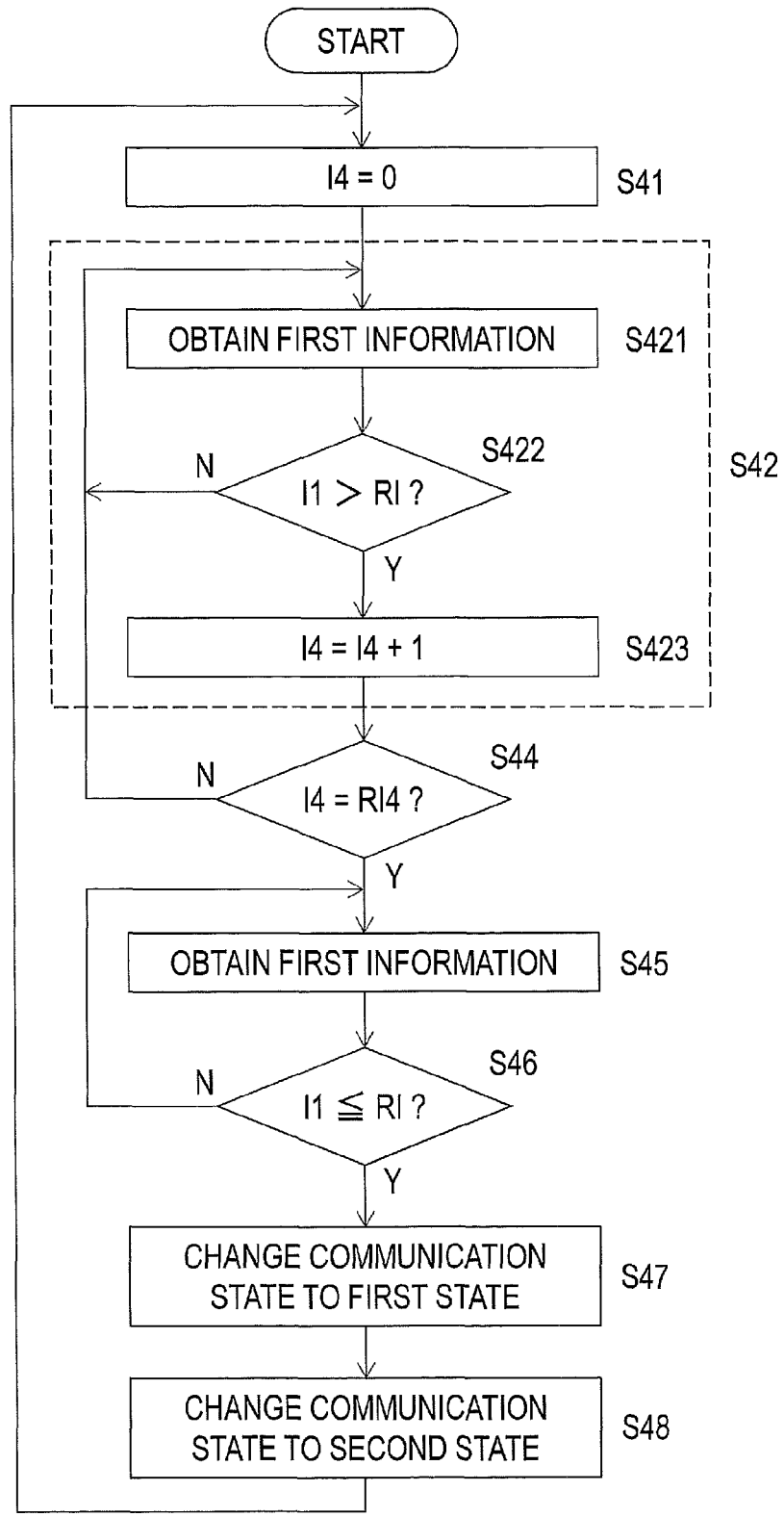
FIG. 13 is a flow chart showing an operation of the bicycle operating device illustrated in FIG. 12.

As seen in FIG. 12, the bicycle operating device 410 comprises a control unit 466. The control unit 466 includes an information obtaining part 476. The control unit 466 has substantially the same configuration as that of the control unit 66 in the first embodiment except for the information obtaining part 476. However, the control unit 466 is configured to control the changing unit 56 based on a comparison between the operating information and the reference information such that the changing unit 56 maintains the second state.

The information obtaining part 476 is configured to obtain, as the operating information, at least one of first frequency information I4, second frequency information I5, third frequency information I6, first amount information I7, second amount information I8, and third amount information I9.

The first frequency information I4 relates to frequency of change in the force applied to the operating member 72. The second frequency information I5 relates to frequency of the movement of the operating member 72 from the rest position P31. The third frequency information relates to frequency of the movement of the piston 24 from the initial position P11. The first amount information I7 relates to an amount of change in a hydraulic pressure in the cylinder bore 28. The second amount information I8 relates to an amount of change in a temperature of fluid in the cylinder bore 28. The third amount information I9 relates to an amount of change in an ambient temperature around the bicycle operating device 10.

In the illustrated embodiment, the information obtaining part 476 is configured to obtain, as the operating information, the first frequency information I4 relating to the frequency of change in the force applied to the operating member 72. However, the information obtaining part 476 can be configured to obtain, as the operating information, at least one of the second frequency information I5, the third frequency information I6, the first amount information I7, the second amount information I8, and the third amount information I9 instead of or in addition to the first frequency information I4.

As seen in FIG. 12, the information obtaining part 476 includes the operating force sensor 78 and a counter 487. The counter 487 is configured to count the frequency of change in the operating force applied to the operating member 72 based on the operating force sensed by the operating force sensor 78. Specifically, the counter 487 is configured to count a total number of times at which the first information I1 exceeds the reference information RI. The information obtaining part 476 is configured to obtain, as the first frequency information I4, the total number of times at which the first information I1 exceeds the reference information RI. In accordance with this configuration of the information obtaining part 476, the control unit 466 is configured to store a reference total number of times in the memory 70 as reference information RI4.

The control unit 466 controls the changing unit 56 to maintain the second state when the first frequency information I4 is equal to or smaller than the reference information RI4 in the second state. The control unit 466 controls the changing unit 56 to change the communication state from the second state to the first state when the first frequency information I4 is larger than the reference information RI4 in the second state. The control unit 466 controls the changing unit 56 to change the communication state from the first state to the second state when a predetermined time period is elapsed from a timing at which the communication state is changed from the second state to the first state. Since the control unit 466 is configured to control the changing unit 56 based on a comparison between the operating information and the reference information RI4, it is possible to effectively shorten the response time lag using the operating information and the reference information RI4.

The control unit 466 includes a comparator 479 configured to compare the operating information with the reference information. The comparator 479 has substantially the same configuration as that of the comparator 79 in the first embodiment. In the illustrated embodiment, however, the comparator 479 is further configured to compare the first frequency information I4 with the reference information RI4.

The control unit 466 includes an actuation controller 480 configured to control the actuator 60 of the changing unit 56 based on a comparison result of the comparator 479. The actuation controller 480 has substantially the same configuration as that of the actuation controller 80 in the first embodiment. In the illustrated embodiment, however, the actuator 60 is configured to position the valve member 58 at the second position P22 (FIG. 5) in a state where electric power is not supplied to the actuator 60. Namely, the changing unit 56 serves as a normally closed valve.

In the illustrated embodiment, the actuation controller 480 controls the actuator 60 to maintain the second state when the first frequency information I4 is equal to or smaller than the reference information RI4 in the second state. The actuation controller 480 controls the actuator 60 to change the communication state from the second state to the first state when the first frequency information I4 is larger than the reference information RI4 in the second state. The actuation controller 480 controls the actuator 60 to change the communication state from the first state to the second state when a predetermined time period is elapsed from a timing at which the communication state is changed from the second state to the first state.

The operation of the bicycle operating device 410 will be described in detail here referring to FIG. 13. As seen in FIG. 13, the first frequency information I4 is reset to zero by the counter 487 (step S41). The first frequency information I4 is obtained by the information obtaining part 476 as the operating information (step S42). Specifically, the first information I1 is obtained by the information obtaining part 476 (step S421). In the illustrated embodiment, the first information I1 is compared with the reference information RI by the comparator 479 (step S422). When the first information I1 is equal to or smaller than the reference information RI in the second state, the control unit 466 concludes that the operating member 72 is not operated by the user. Accordingly, the changing unit 56 is controlled by the control unit 466 to maintain the second state (FIG. 5) in the hydraulic unit 20 (step S422).

When the first information I1 is larger than the reference information RI in the second state, the control unit 466 concludes that the operating member 72 is operated by the user. Accordingly, the first frequency information I4 is incremented by one by the counter 487 (steps S422 and S423).

Next, the operating information is compared with the reference information by the control unit 466. In the illustrated embodiment, the first frequency information I4 is compared with the reference information RI4 (step S44). When the first frequency information I4 is different from the reference information RI4, the steps S421 to S423 are repeated (step S44).

When the first frequency information I4 is equal to the reference information RI4, the first information I1 is obtained by the information obtaining part 476 as well as the step S421 (step S45).

The first information I1 is compared with the reference information RI by the comparator 479 (step S46). When the first information I1 is larger than the reference information RI in the second state, the control unit 466 concludes that the user keeps operating the operating member 72. Accordingly, the changing unit 56 is controlled by the control unit 466 to maintain the second state (FIG. 5) in the hydraulic unit 20 (step S46). The steps S45 and S46 are repeated until the first information I1 is equal to or smaller than the reference information RI (steps S45 and S46).

In the steps S421 and S45, the first information I1 is obtained by the information obtaining part 476. However, other information such as the second information I2 and the third information I3 can be used in the steps S421 and S45. The reference information RI in the step S422 can be different from the reference information RI in the step S46. The control unit 466 can be configured to control the changing unit 56 without using the reference information RI. Furthermore, the control unit 466 can be configured to change the reference information RI and/or the reference information RI4 via an input device such as a personal computer.

When the first information I1 is equal to or smaller than the reference information RI in the second state, the changing unit 56 is controlled by the control unit 466 to change the communication state of the hydraulic unit 20 from the second state (FIG. 5) to the first state (FIG. 4) (steps S46 and S47). In the illustrated embodiment, for example, the changing unit 56 is controlled by the control unit 466 to keep the first state (FIG. 4) for a predetermined time period.

In the first state, the reserve chamber 30 of the reservoir 26 absorbs the volume change of the hydraulic fluid caused by a change in the fluid temperature and/or in the ambient temperature. This can prevent an initial position of brake pads of the hydraulic brake device BC1 from changing due to the change in the fluid temperature and/or in the ambient temperature.

After the predetermined time period is elapsed, the changing unit 56 is controlled by the control unit 466 to change the communication state of the hydraulic unit 20 from the first state (FIG. 4) to the second state (FIG. 5) (step S48). The process returns to the step S41, and the steps S41 to S48 are repeated.

With the bicycle operating device 410, it is possible to obtain substantially the same advantageous effects as those of the bicycle operating device 10 in accordance with the first embodiment.

Fifth Embodiment

A bicycle operating device 510 in accordance with a fifth embodiment will be described below referring to FIG. 14. The bicycle operating device 510 has the same construction as that of the bicycle operating device 410 except for the control unit 466. Thus, elements having substantially the same function as those in the above embodiments will be numbered the same here, and will not be described and/or illustrated again in detail here for the sake of brevity.

Figure 14:
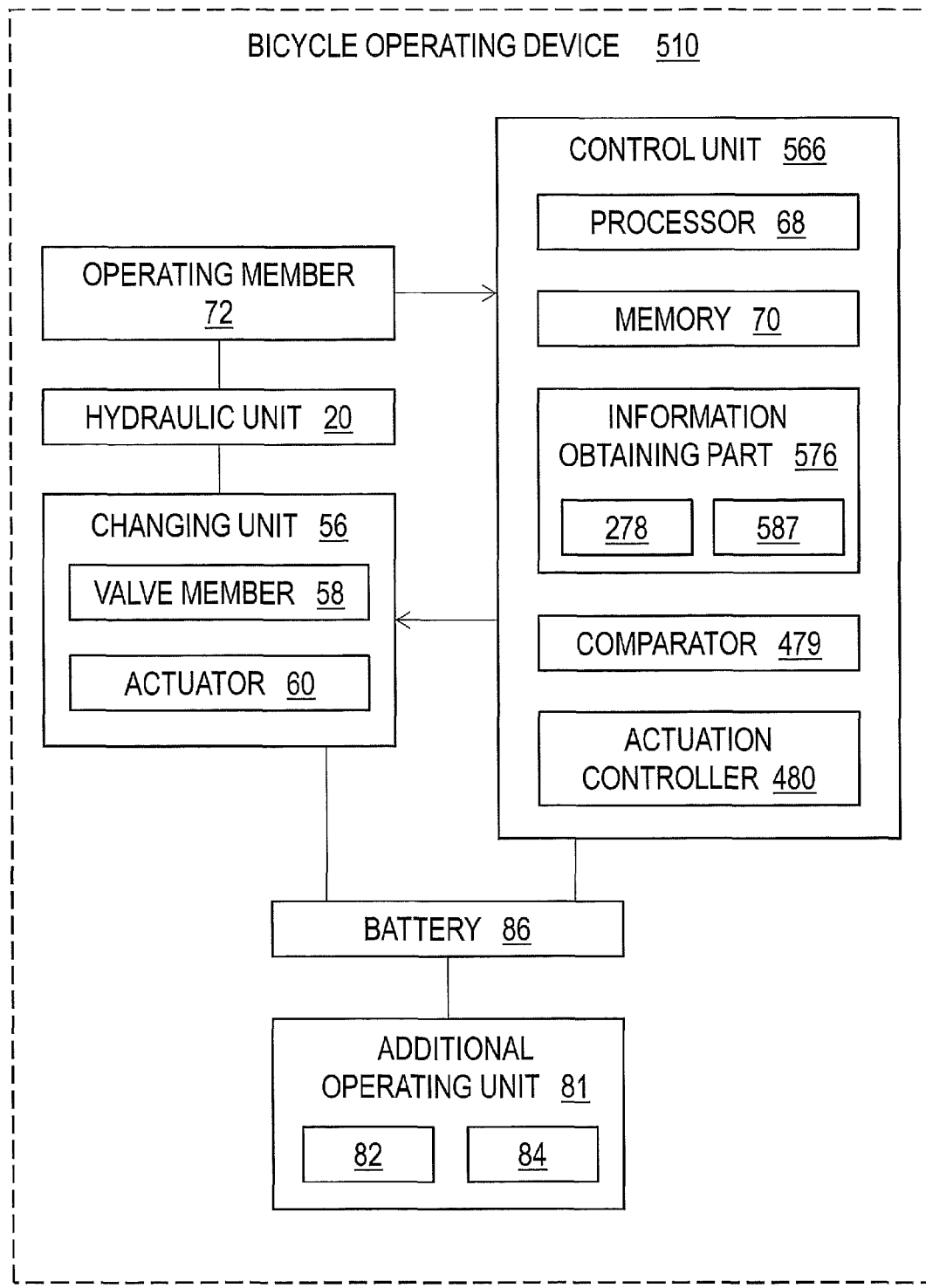
FIG. 14 is a block diagram of a bicycle operating device in accordance with a fifth embodiment.

As seen in FIG. 14, the bicycle operating device 510 comprises a control unit 566. The control unit 566 includes an information obtaining part 576. The control unit 566 has substantially the same configuration as that of the control unit 466 in the fourth embodiment except for the information obtaining part 576. In the illustrated embodiment, the information obtaining part 576 is configured to obtain, as the operating information, the second frequency information I5 relating to frequency of the movement of the operating member 72 from the rest position P31.

The information obtaining part 576 includes the rotary position sensor 278 and a counter 587. The counter 587 is configured to count the frequency of the movement of the operating member 72 from the rest position P31 based on the second information I2 obtained by the rotary position sensor 278. Specifically, the counter 587 is configured to count a total number of times at which the second information I2 exceeds the reference information RI. The information obtaining part 576 is configured to obtain, as the second frequency information I5, the total number of times at which the second information I2 exceeds the reference information RI.

In the bicycle operating device 510, the control unit 566 is configured to control the changing unit 56 based on a comparison between the second frequency information I5 and the reference information RI4. The operation of the bicycle operating device 510 is substantially the same as the operation of the bicycle operating device 410 in accordance with the fourth embodiment. Accordingly, the description and flow chart of the operation of the bicycle operating device 510 can be obtained by changing "the first frequency information I4" to "the second frequency information I5" and changing "the first information I1" to "the second information I2" in the description and FIG. 13 of the fourth embodiment. Thus, the detail description and depiction of the operation of the bicycle operating device 510 will be omitted here for the sake of brevity.

With the bicycle operating device 510, it is possible to obtain substantially the same advantageous effects as those of the bicycle operating device 10 in accordance with the first embodiment.

Sixth Embodiment

A bicycle operating device 610 in accordance with a sixth embodiment will be described below referring to FIG. 15. The bicycle operating device 610 has the same construction as that of the bicycle operating device 410 except for the control unit 466. Thus, elements having substantially the same function as those in the above embodiments will be numbered the same here, and will not be described and/or illustrated again in detail here for the sake of brevity.

Figure 15:
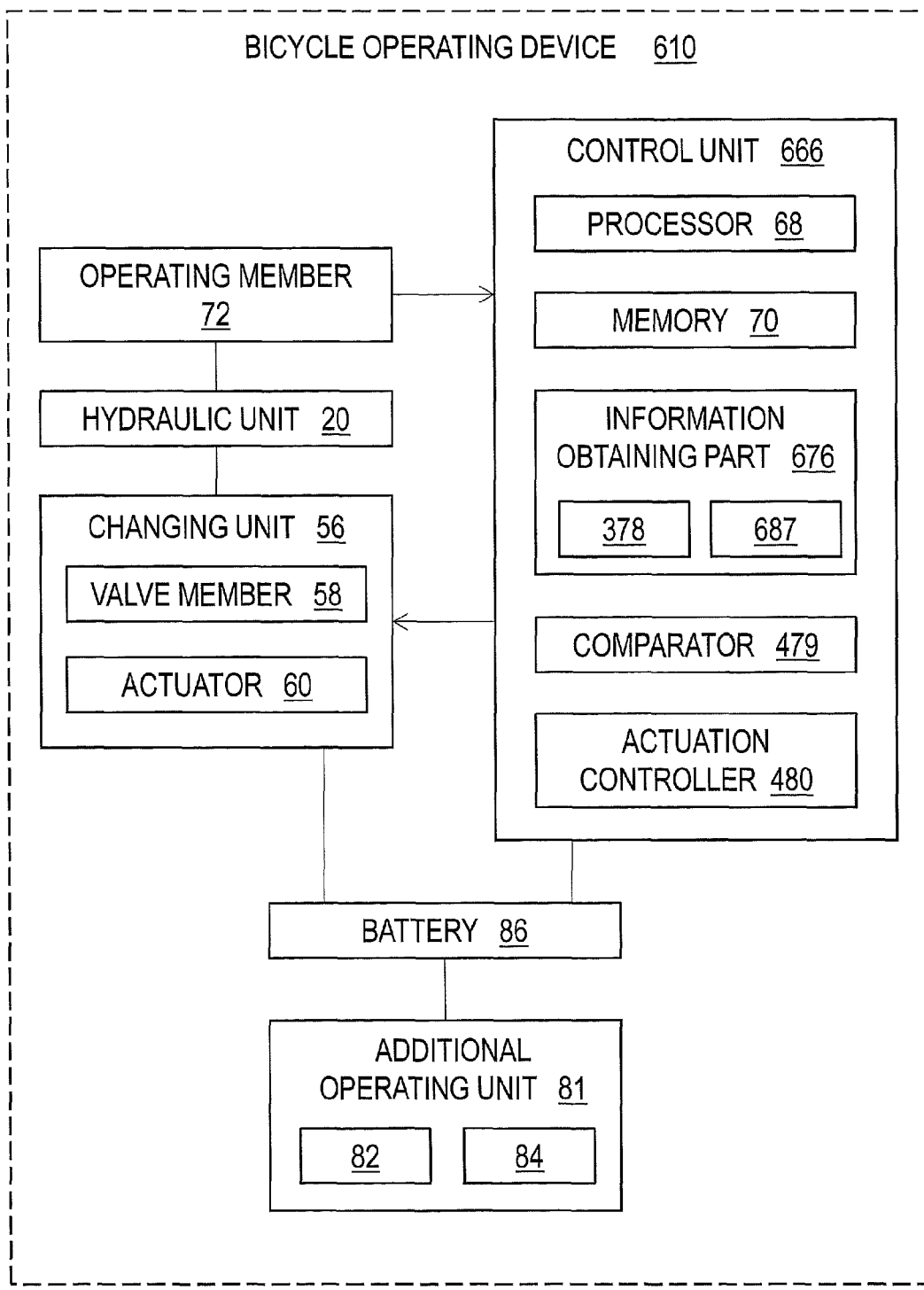
FIG. 15 is a block diagram of a bicycle operating device in accordance with a sixth embodiment.

As seen in FIG. 15, the bicycle operating device 610 comprises a control unit 666. The control unit 666 includes an information obtaining part 676. The control unit 666 has substantially the same configuration as that of the control unit 466 in the fourth embodiment except for the information obtaining part 676. In the illustrated embodiment, the information obtaining part 676 is configured to obtain, as the operating information, the third frequency information I6 relating to frequency of the movement of the piston 24 from the initial position P11.

The information obtaining part 676 includes the distance sensor 378 and a counter 687. The counter 687 is configured to count the frequency of the movement of the piston 24 from the initial position P11 based on the third information I3 obtained by the distance sensor 378. Specifically, the counter 687 is configured to count a total number of times at which the third information I3 exceeds the reference information RI4. The information obtaining part 676 is configured to obtain, as the third frequency information I6, the total number of times at which the third information I3 exceeds the reference information RI4. The control unit 666 is configured to store a reference total number of times in the memory 70 as the reference information RI4.

In the bicycle operating device 610, the control unit 666 is configured to control the changing unit 56 based on a comparison between the third frequency information I6 and the reference information RI4. The operation of the bicycle operating device 610 is substantially the same as the operation of the bicycle operating device 410 in accordance with the fourth embodiment. Accordingly, the description and flow chart of the operation of the bicycle operating device 610 can be obtained by changing "the first frequency information I4" to "the third frequency information I6" and changing "the first information Ti" to "the third information I3" in the description and FIG. 13 of the fourth embodiment. Thus, the detail description and depiction of the operation of the bicycle operating device 610 will be omitted here for the sake of brevity.

With the bicycle operating device 610, it is possible to obtain substantially the same advantageous effects as those of the bicycle operating device 10 in accordance with the first embodiment.

Seventh Embodiment

Figure 17:
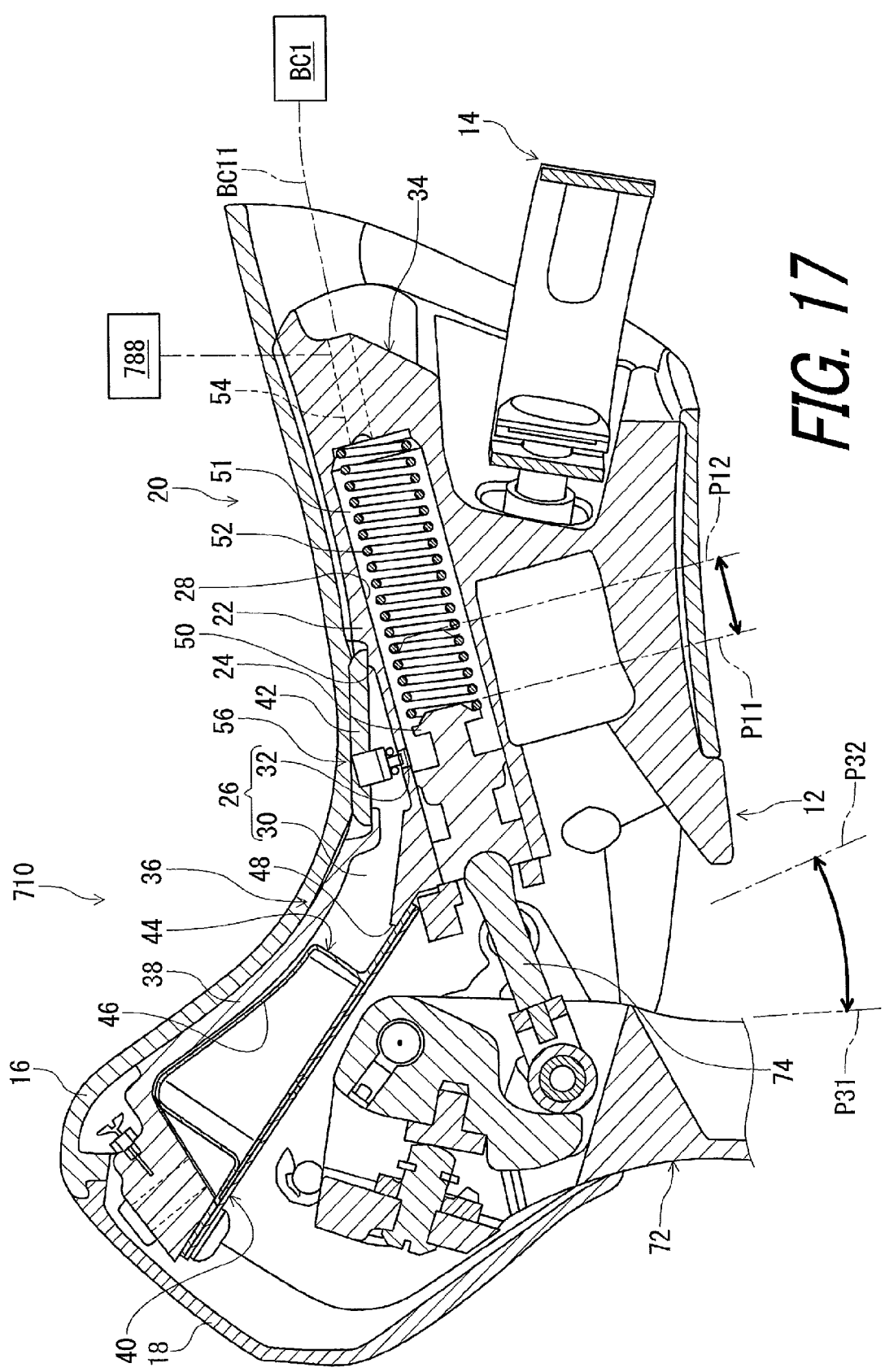
FIG. 17 is a partial cross-sectional view of the bicycle operating device in accordance with the seventh embodiment.
Figure 18:
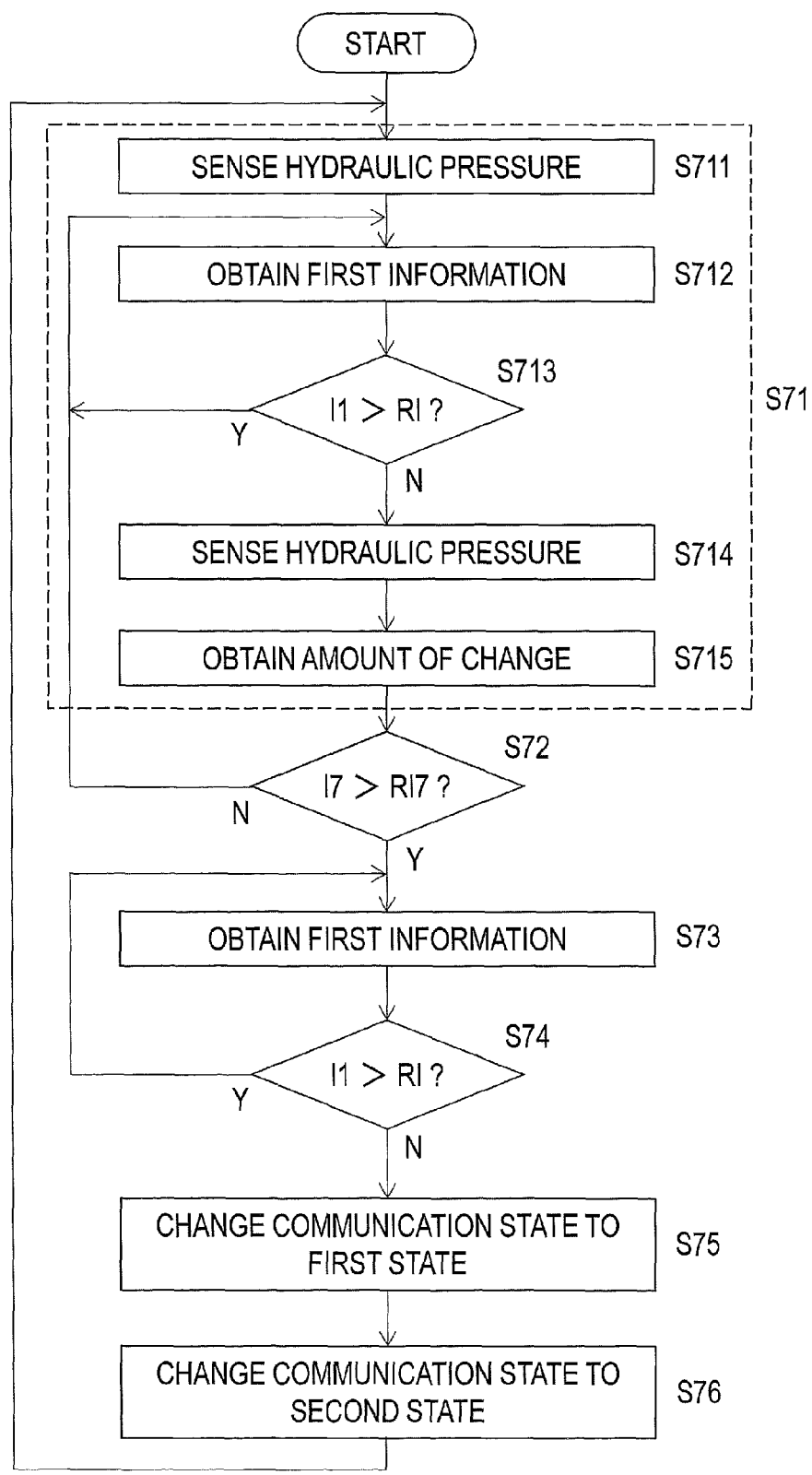
FIG. 18 is a flow chart showing an operation of the bicycle operating device illustrated in FIG. 16.

A bicycle operating device 710 in accordance with a seventh embodiment will be described below referring to FIGS. 16 to 18. The bicycle operating device 710 has the same construction as that of the bicycle operating device 410 except for the control unit 766. Thus, elements having substantially the same function as those in the above embodiments will be numbered the same here, and will not be described and/or illustrated again in detail here for the sake of brevity.

Figure 16:
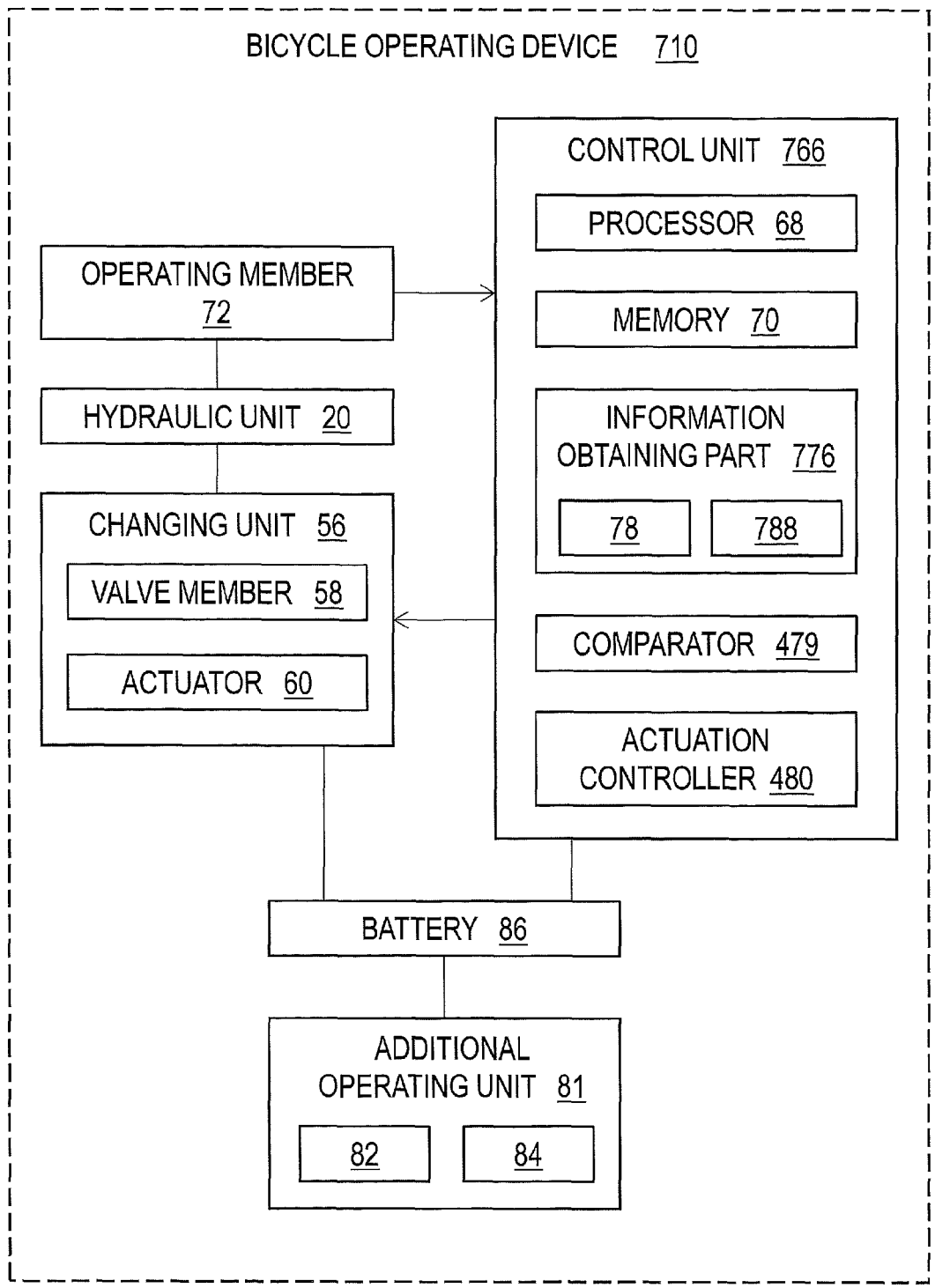
FIG. 16 is a block diagram of a bicycle operating device in accordance with a seventh embodiment.

As seen in FIG. 16, the bicycle operating device 710 comprises a control unit 766. The control unit 766 includes an information obtaining part 776. The control unit 766 has substantially the same configuration as that of the control unit 466 in the fourth embodiment except for the information obtaining part 776. In the illustrated embodiment, the information obtaining part 776 is configured to obtain, as the operating information, the first amount information I7 relating to the amount of change in the hydraulic pressure in the cylinder bore 28.

The information obtaining part 776 includes the operating force sensor 78 and a pressure sensor 788. The pressure sensor 788 is configured to sense the hydraulic pressure in the cylinder bore 28. For example, the pressure sensor 788 is connected to the outlet port 54 (FIG. 17). The information obtaining part 776 is configured to obtain, as the first amount information I7, the amount of change in the hydraulic pressure in the cylinder bore 28 based on the hydraulic pressure sensed by the pressure sensor 788. In accordance with this configuration of the information obtaining part 776, the control unit 466 is configured to store a reference differential pressure in the memory 70 as reference information RI7.

In the illustrated embodiment, the control unit 766 controls the changing unit 56 to maintain the second state when the first amount information I7 is equal to or smaller than the reference information RI7 in the second state. The control unit 766 controls the changing unit 56 to change the communication state from the second state to the first state when the first amount information I7 is larger than the reference information RI7 in the second state. The control unit 766 controls the changing unit 56 to change the communication state from the first state to the second state when a predetermined time period is elapsed from a timing at which the communication state is changed from the second state to the first state. Since the control unit 766 is configured to control the changing unit 56 based on a comparison between the operating information and the reference information, it is possible to effectively shorten the response time lag using the operating information and the reference information.

The operation of the bicycle operating device 710 will be described in detail here referring to FIG. 18. As seen in FIG. 18, the first amount information I7 is obtained by the information obtaining part 776 (step S71). Specifically, the hydraulic pressure in the cylinder bore 28 is sensed by the pressure sensor 788 of the information obtaining part 776 as an initial pressure (step S711). In steps S712 and S713, it is determined whether the operating member 72 is operated by the user. Specifically, the first information I1 is obtained by the information obtaining part 776 (step S712). The first information I1 is compared with the reference information RI (step S713). When the first information I1 is larger than the reference information RI, the control unit 766 concludes that the operating member 72 is operated by the user. Thus, the steps S712 and S713 are repeated. When the first information I1 is equal to or smaller than the reference information RI, the control unit 766 concludes that the operating member 72 is not operated by the user. Accordingly, the hydraulic pressure is sensed by the pressure sensor 788 (step S714).

The amount of change in the first information I1 (the hydraulic pressure) is obtained by the control unit 766 as the first amount information I7 (step S715). The first amount information I7 is compared with the reference information RI7 (step S72). When the first amount information I7 is equal to or smaller than the reference information RI, the steps S712 to S72 are repeated. When the first amount information I7 is larger than the reference information RI7, the first information I1 is obtained by the information obtaining part 776 for determining whether the operating member 72 is operated (step S73).

When the first information I1 is larger than the reference information RI in the second state, the steps S73 and S74 are repeated since the operating member 72 is operated by the user (step S74). Namely, the changing unit 56 is controlled by the control unit 766 to maintain the second state (FIG. 5) in the hydraulic unit 20. The reference information RI in the step S713 can be different from the reference information RI in the step S74. The control unit 766 can be configured to control the changing unit 56 without using the reference information RI. Furthermore, the control unit 766 can be configured to change the reference information RI and/or the reference information RI7 via an input device such as a personal computer.

When the first information I1 is equal to or smaller than the reference information RI in the second state, the control unit 766 concludes that the operating member 72 is not operated by the user. Accordingly, the changing unit 56 is controlled by the control unit 766 to change the communication state from the second state (FIG. 4) to the first state (FIG. 4) (step S75). In the illustrated embodiment, for example, the changing unit 56 is controlled by the control unit 766 to keep the first state (FIG. 4) for a predetermined time period.

After the predetermined time period is elapsed, the changing unit 56 is controlled by the control unit 766 to change the communication state of the hydraulic unit 20 from the first state (FIG. 4) to the second state (FIG. 5) (step S76). The process returns to the step S71, and the steps S71 to S76 are repeated.

With the bicycle operating device 710, it is possible to obtain substantially the same advantageous effects as those of the bicycle operating device 10 in accordance with the first embodiment.

Eighth Embodiment

A bicycle operating device 810 in accordance with an eighth embodiment will be described below referring to FIGS. 19 and 20. The bicycle operating device 810 has the same construction as that of the bicycle operating device 410 except for the control unit 866. Thus, elements having substantially the same function as those in the above embodiments will be numbered the same here, and will not be described and/or illustrated again in detail here for the sake of brevity.

Figure 19:
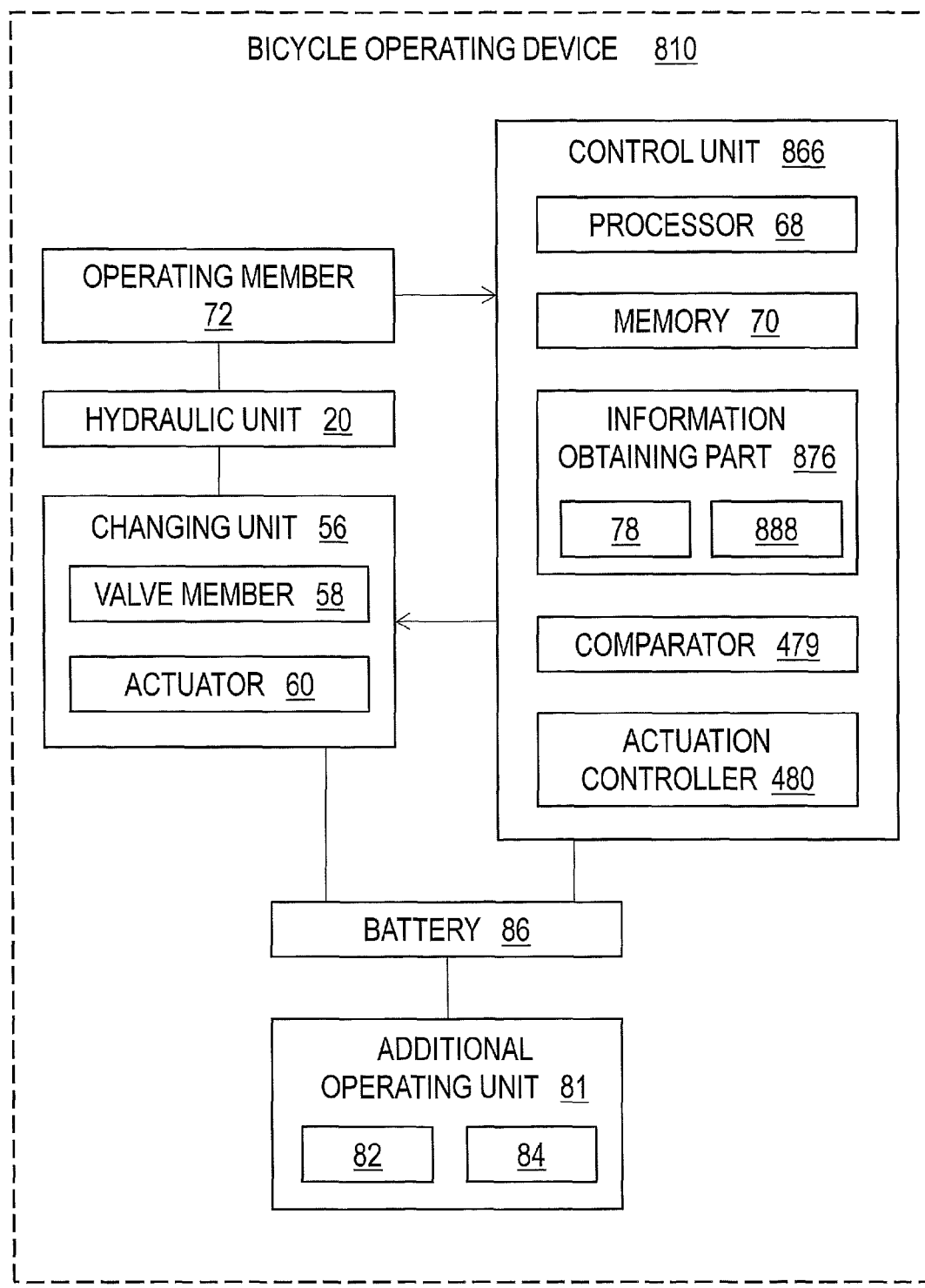
FIG. 19 is a block diagram of a bicycle operating device in accordance with an eighth embodiment.
Figure 20:
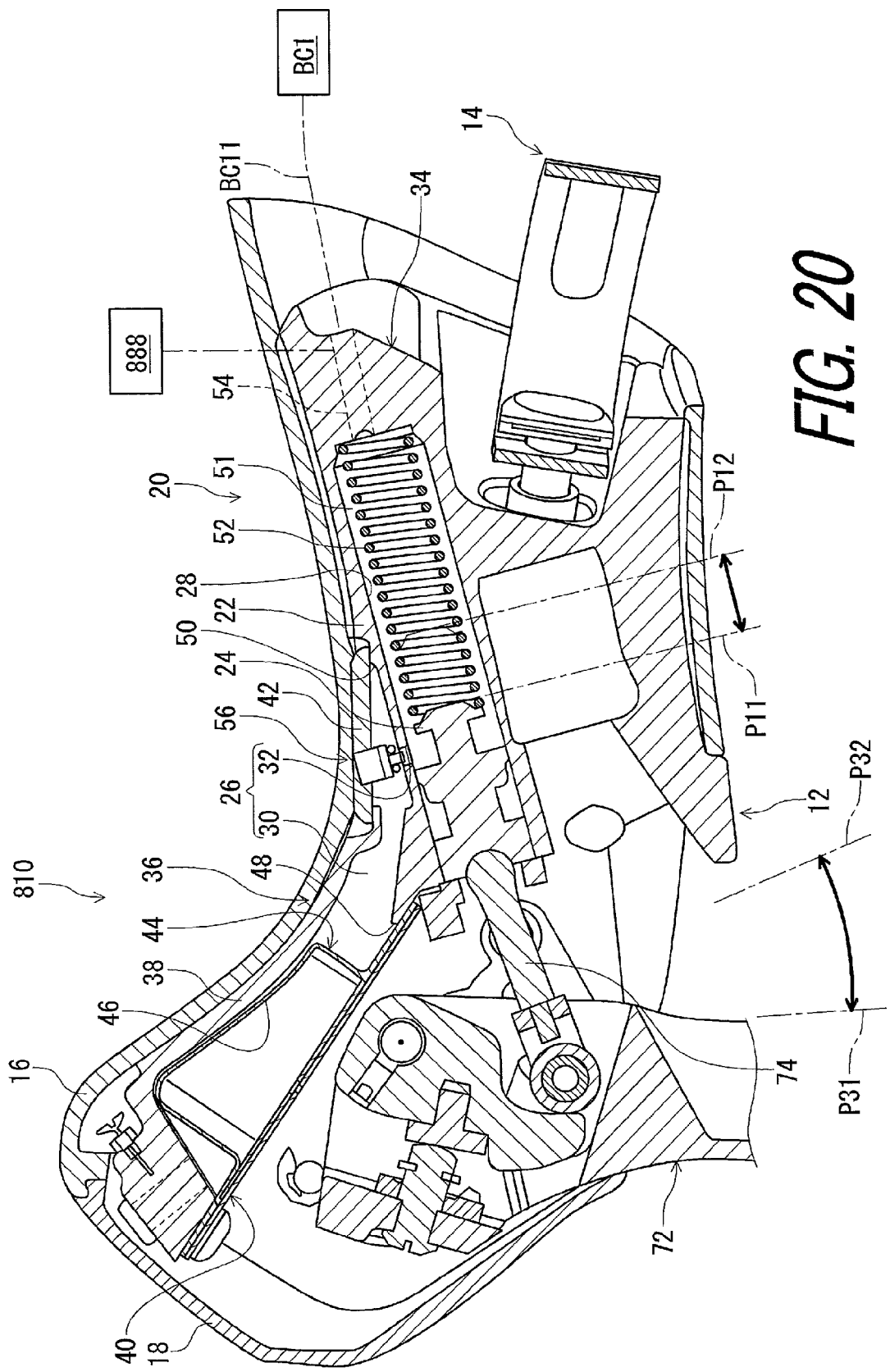
FIG. 20 is a partial cross-sectional view of the bicycle operating device in accordance with the eighth embodiment.

As seen in FIG. 19, the bicycle operating device 810 comprises a control unit 866. The control unit 866 includes an information obtaining part 876. The control unit 866 has substantially the same configuration as that of the control unit 766 in the seventh embodiment except for the information obtaining part 876. In the illustrated embodiment, the information obtaining part 876 is configured to obtain, as the operating information, the second amount information I8 relating to the amount of change in the temperature of fluid in the cylinder bore 28.

The information obtaining part 876 includes the operating force sensor 78 and a fluid temperature sensor 888. The fluid temperature sensor 888 is configured to sense the fluid temperature in the cylinder bore 28. For example, the fluid temperature sensor 888 is connected to the outlet port 54 (FIG. 20). The information obtaining part 876 is configured to obtain, as the second amount information I8, the amount of change in the fluid temperature in the cylinder bore 28 based on the fluid temperature sensed by the fluid temperature sensor 888. In accordance with this configuration of the information obtaining part 876, the control unit 866 is configured to store a reference differential temperature in the memory 70 as the reference information RI7.

In the bicycle operating device 810, the control unit 866 is configured to control the changing unit 56 based on a comparison between the second amount information I8 and the reference information RI7. The operation of the bicycle operating device 810 is substantially the same as the operation of the bicycle operating device 710 in accordance with the seventh embodiment. Accordingly, the description and flow chart of the operation of the bicycle operating device 810 can be obtained by changing "the first amount information I7" to "the second amount information I8" in the description and FIG. 18 of the seventh embodiment. Thus, the detail description and depiction of the operation of the bicycle operating device 810 will be omitted here for the sake of brevity.

With the bicycle operating device 810, it is possible to obtain substantially the same advantageous effects as those of the bicycle operating device 10 in accordance with the first embodiment.

Ninth Embodiment

A bicycle operating device 910 in accordance with a ninth embodiment will be described below referring to FIGS. 21 and 22. The bicycle operating device 910 has the same construction as that of the bicycle operating device 410 except for the information obtaining part 476. Thus, elements having substantially the same function as those in the above embodiments will be numbered the same here, and will not be described and/or illustrated again in detail here for the sake of brevity.

Figure 21:
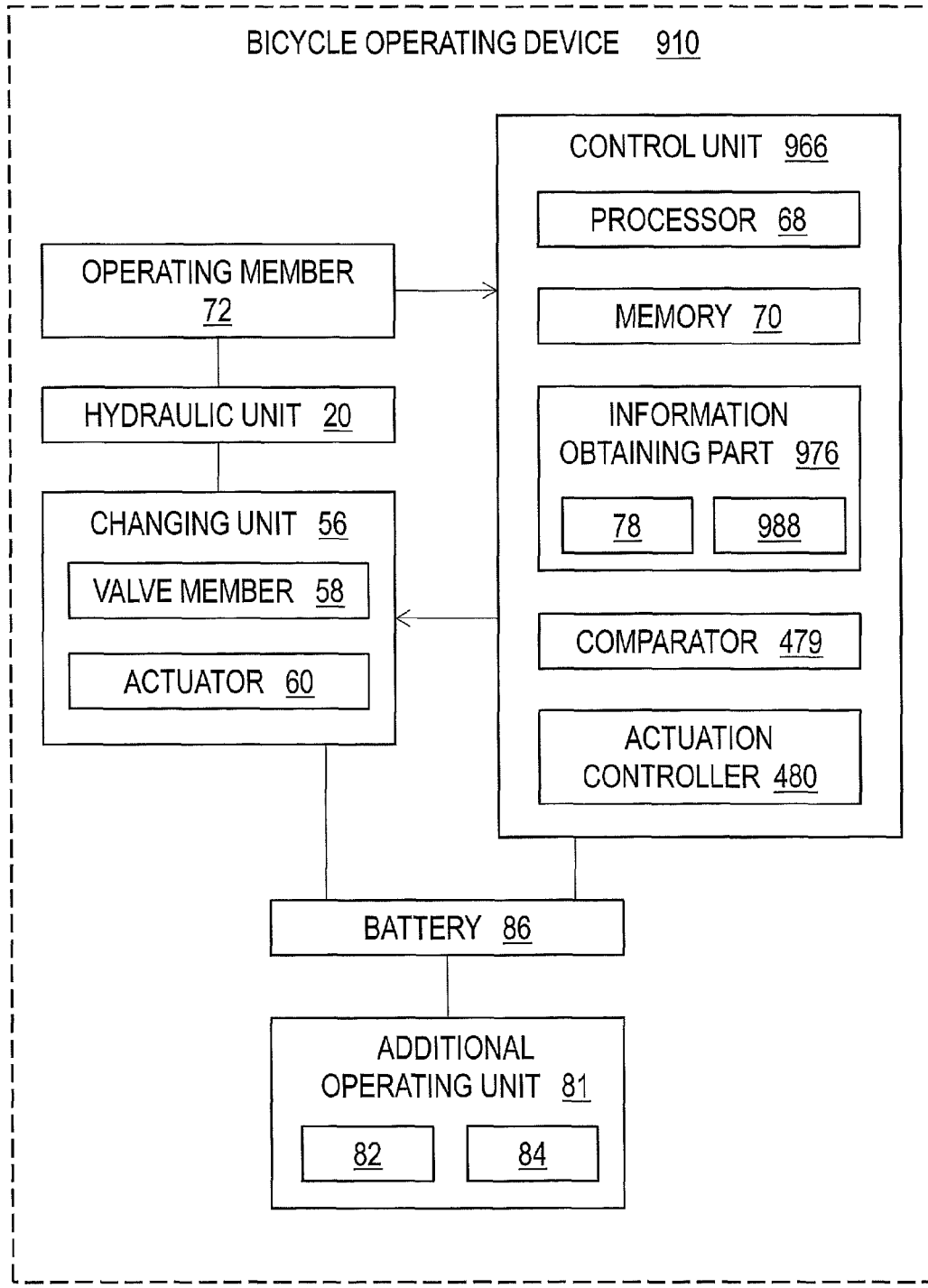
FIG. 21 is a block diagram of a bicycle operating device in accordance with a ninth embodiment.

As seen in FIG. 21, the bicycle operating device 910 comprises a control unit 966. The control unit 966 includes an information obtaining part 976. The control unit 966 has substantially the same configuration as that of the control unit 766 in the seventh embodiment except for the information obtaining part 976. In the illustrated embodiment, the information obtaining part 976 is configured to obtain, as the operating information, the third amount information I9 relating to the amount of change in the temperature of fluid in the cylinder bore 28.

The information obtaining part 976 includes the operating force sensor 78 and an ambient temperature sensor 988. The ambient temperature sensor 988 is configured to sense the ambient temperature in the cylinder bore 28. For example, the ambient temperature sensor 988 is attached to the base member 12 (FIG. 22). The information obtaining part 976 is configured to obtain, as the third amount information I9, the amount of change in the fluid temperature in the cylinder bore 28 based on the ambient temperature sensed by the ambient temperature sensor 988. In accordance with this configuration of the information obtaining part 976, the control unit 966 is configured to store a reference differential temperature in the memory 70 as the reference information RI7.

In the bicycle operating device 910, the control unit 966 is configured to control the changing unit 56 based on a comparison between the third amount information I9 and the reference information RI7. The operation of the bicycle operating device 910 is substantially the same as the operation of the bicycle operating device 710 in accordance with the seventh embodiment. Accordingly, the description and flow chart of the operation of the bicycle operating device 910 can be obtained by changing "the first amount information I7" to "the third amount information I9" in the description and FIG. 18 of the seventh embodiment. Thus, the detail description and depiction of the operation of the bicycle operating device 910 will be omitted here for the sake of brevity.

With the bicycle operating device 910, it is possible to obtain substantially the same advantageous effects as those of the bicycle operating device 10 in accordance with the first embodiment.

It will be apparent to those skilled in the bicycle field from the present disclosure that the constructions of the above embodiments can be at least partially combined with each other if needed and/or desired.

The term "configured" as used herein to describe a component, section or part of a device includes hardware and/or software that is constructed and/or programmed to carry out the desired function. The desired function can be carried out by hardware, software, or a combination of hardware and software.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:
1. A bicycle operating device comprising:
   a hydraulic unit including
      a hydraulic cylinder including a cylinder bore;
      a piston movably provided in the cylinder bore; and
      a reservoir including a reserve chamber and a connecting hole configured to connect the cylinder bore to the reserve chamber; and
   a changing unit separately provided from the piston and configured to change a communication state defined between the cylinder bore and the reserve chamber via the connecting hole, the changing unit being attached to the reservoir,
   the changing unit including
      a valve member movable relative to the reserve chamber to change the communication state, and
      an actuator configured to move the valve member relative to the reserve chamber, and
   the actuator being at least partially provided in the reserve chamber.

2. The bicycle operating device according to claim 1, further comprising:
a control unit configured to control the changing unit to change the communication state.

3. The bicycle operating device according to claim 2, wherein
the control unit is configured to control the changing unit to change the communication state based on operating information relating to the bicycle operating device.

4. The bicycle operating device according to claim 3, further comprising:
an operating member configured to be operated by a user and to be operatively coupled to the piston to move the piston relative to the hydraulic cylinder in response to an operation on the operating member, wherein
the operating information includes information relating to the operation on the operating member.

5. The bicycle operating device according to claim 1, further comprising:
an additional operating unit via which a bicycle component is to be operated by a user.

6. The bicycle operating device according to claim 5, wherein,
the additional operating unit includes an electric switch.

7. The bicycle operating device according to claim 1, wherein
the reservoir includes an inner surface defining the reserve chamber, and
the changing unit is mounted to the inner surface of the reservoir chamber.

8. A bicycle operating device comprising:
a hydraulic unit including
a hydraulic cylinder including a cylinder bore;
a piston movably provided in the cylinder bore; and
a reservoir including a reserve chamber and a connecting hole configured to connect the cylinder bore to the reserve chamber;
a changing unit separately provided from the piston and configured to change a communication state defined between the cylinder bore and the reserve chamber via the connecting hole;
a control unit configured to control the changing unit to change the communication state, the control unit being configured to control the changing unit to change the communication state based on operating information relating to the bicycle operating device; and
an operating member configured to be operated by a user and to be operatively coupled to the piston to move the piston relative to the hydraulic cylinder in response to an operation on the operating member, the operating information including information relating to the operation on the operating member,
the operating member being movable relative to the hydraulic cylinder between a rest position and an operated position,
the piston being movable relative to the hydraulic cylinder between an initial position and an actuated position in response to movement of the operating member, and
the control unit including an information obtaining part configured to obtain, as the operating information, at least one of
first information relating to a force applied from a user to the operating member,
second information relating to movement of the operating member from the rest position, and
third information relating to movement of the piston from the initial position.

9. A bicycle operating device comprising:
a hydraulic unit including
a hydraulic cylinder including a cylinder bore;
a piston movably provided in the cylinder bore; and
a reservoir including a reserve chamber and a connecting hole configured to connect the cylinder bore to the reserve chamber;
a changing unit separately provided from the piston and configured to change a communication state defined between the cylinder bore and the reserve chamber via the connecting hole;
a control unit configured to control the changing unit to change the communication state, the control unit being configured to control the changing unit to change the communication state based on operating information relating to the bicycle operating device; and
an operating member configured to be operated by a user and to be operatively coupled to the piston to move the piston relative to the hydraulic cylinder in response to an operation on the operating member, the operating information including information relating to the operation on the operating member,
the operating member being movable relative to the hydraulic cylinder between a rest position and an operated position,
the piston being movable relative to the hydraulic cylinder between an initial position and an actuated position, and
the control unit including an information obtaining part configured to obtain, as the operating information, at least one of
first frequency information relating to frequency of change in force applied to the operating member,
second frequency information relating to frequency of movement of the operating member from the rest position,
third frequency information relating to frequency of movement of the piston from the initial position,
first amount information relating to an amount of change in a hydraulic pressure in the cylinder bore,
second amount information relating to an amount of change in a temperature of fluid in the cylinder bore, and
third amount information relating to an amount of change in an ambient temperature around the bicycle operating device.

10. A bicycle operating device comprising:
a hydraulic unit including
a hydraulic cylinder including a cylinder bore;
a piston movably provided in the cylinder bore; and
a reservoir including a reserve chamber and a connecting hole configured to connect the cylinder bore to the reserve chamber;
a changing unit separately provided from the piston and configured to change a communication state defined between the cylinder bore and the reserve chamber via the connecting hole; and
a control unit configured to control the changing unit to change the communication state, the control unit being configured to control the changing unit to change the communication state based on operating information relating to the bicycle operating device,
the control unit is configured to store reference information, and
the control unit is configured to control the changing unit to change the communication state based on the operating information and the reference information.

11. The bicycle operating device according to claim 10, wherein,
the changing unit is configured to change the communication state between
a first state, and
a second state where a communication between the cylinder bore and the reserve chamber is restricted compared with the first state, and
the control unit is configured to control the changing unit based on a comparison between the operating information and the reference information to maintain the first state.

12. The bicycle operating device according to claim 11, wherein
the changing unit is configured to close the communication between the cylinder bore and the reserve chamber in the second state.

13. The bicycle operating device according to claim 11, further comprising:
an operating member configured to be operated by a user and to be operatively coupled to the piston to move the piston relative to the hydraulic cylinder in response to an operation on the operating member, wherein
the operating member is movable relative to the hydraulic cylinder between a rest position and an operated position,
the piston is movable relative to the hydraulic cylinder between an initial position and an actuated position in response to movement of the operating member, and
the control unit includes an information obtaining part configured to obtain, as the operating information, at least one of
first information relating to a force applied from a user to the operating member,
second information relating to movement of the operating member from the rest position, and
third information relating to movement of the piston from the initial position.

14. The bicycle operating device according to claim 10, wherein,
the changing unit is configured to change the communication state between
a first state, and
a second state where a communication between the cylinder bore and the reserve chamber is restricted compared with the first state, and
the control unit is configured to control the changing unit based on a comparison between the operating information and the reference information to maintain the second state.

15. The bicycle operating device according to claim 14, wherein
the changing unit is configured to close the communication between the cylinder bore and the reserve chamber in the second state.

16. The bicycle operating device according to claim 14, further comprising:
an operating member configured to be operated by a user and to be operatively coupled to the piston to move the piston relative to the hydraulic cylinder in response to an operation on the operating member, wherein,
the operating member is movable relative to the hydraulic cylinder between a rest position and an operated position,
the piston is movable relative to the hydraulic cylinder between an initial position and an actuated position in response to movement of the operating member, and
the control unit includes an information obtaining part configured to obtain, as the operating information, at least one of
first frequency information relating to frequency of change in force applied to the operating member,
second frequency information relating to frequency of movement of the operating member from the rest position,
third frequency information relating to frequency of movement of the piston from the initial position,
first amount information relating to an amount of change in a hydraulic pressure in the cylinder bore,
second amount information relating to an amount of change in a temperature of fluid in the cylinder bore, and
third amount information relating to an amount of change in an ambient temperature around the bicycle operating device.

17. The bicycle operating device according to claim 10, wherein,
the control unit is configured to change the reference information.

* * * * *